(12) United States Patent
Mitsuya et al.

(10) Patent No.: US 12,545,671 B2
(45) Date of Patent: Feb. 10, 2026

(54) COMPOUND HAVING BIOLOGICAL ACTIVITY SUCH AS ANTIVIRAL ACTIVITY

(71) Applicant: NATIONAL CENTER FOR GLOBAL HEALTH AND MEDICINE, Tokyo (JP)

(72) Inventors: Hiroaki Mitsuya, Tokyo (JP); Hirokazu Tamamura, Tokyo (JP); Nobuyo Kuwata, Tokyo (JP)

(73) Assignee: NATIONAL CENTER FOR GLOBAL HEALTH AND MEDICINE, Tokyo (JP)

( * ) Notice: Subject to any disclaimer, the term of this patent is extended or adjusted under 35 U.S.C. 154(b) by 510 days.

(21) Appl. No.: 17/928,746

(22) PCT Filed: Jul. 14, 2022

(86) PCT No.: PCT/JP2022/027755
§ 371 (c)(1),
(2) Date: Nov. 30, 2022

(87) PCT Pub. No.: WO2023/286844
PCT Pub. Date: Jan. 19, 2023

(65) Prior Publication Data
US 2024/0246951 A1 Jul. 25, 2024

(30) Foreign Application Priority Data
Jul. 15, 2021 (JP) .................. 2021-117426

(51) Int. Cl.
*C07D 417/14* (2006.01)
*A61K 31/428* (2006.01)
*A61P 31/14* (2006.01)

(52) U.S. Cl.
CPC .......... *C07D 417/14* (2013.01); *A61K 31/428* (2013.01); *A61P 31/14* (2018.01)

(58) Field of Classification Search
CPC ................................... C07D 417/14
USPC ......................................... 514/367
See application file for complete search history.

(56) References Cited

U.S. PATENT DOCUMENTS

2021/0355111 A1  11/2021  Arnold et al.

FOREIGN PATENT DOCUMENTS

| JP | 2002-535394 A | 10/2002 |
| WO | 2022/013684 A1 | 1/2022 |
| WO | 2022/119858 A1 | 6/2022 |

OTHER PUBLICATIONS

Patani et al., Chem. Rev. (1996) 96, pp. 3147-3149.*
Sep. 27, 2022 International Search Report issued in Patent Application No. PCT/JP2022/027755.
Ortuso, Francesco et al., "Structural genetics of circulating variants affecting the SARS-CoV-2 spike/human ACE2 complex.", Journal of Biomolecular Structure and Dynamics, (2022), vol. 40, No. 14, pp. 6545-6555.
Polack, Fernando P. et al., "Safety and Efficacy of the BNT162b2 mRNA Covid-19 Vaccine.", The New England Journal of Medicine, (2020), pp. 1-13.
Owen, Dafydd, "Oral Inhibitors of the SARS-CoV-2 Main Protease for the Treatment of COVID-19.", Spring ACS Meeting, (2021).
Hattori, Shin-ichiro et al., "A small molecule compound with an indole moiety inhibits the main protease of SARS-CoV-2 and blocks virus replication.", Nature Communications, (2021), vol. 12, No. 668, pp. 1-12.
Masand, Vijay H. et al., "Structure features of peptide-type SARS-CoV main protease inhibitors: Quantitative structure activity relationship study.", Chemometrics and Intelligent Laboratory Systems, (2020), vol. 206, No. 104172, pp. 1-10.
Owen, Daffyd R. et al., "An oral SARS-CoV-2 Mpro inhibitor clinical candidate for the treatment of COVID-19.", Science, (2021), vol. 374, pp. 1-8.
Thanigaimalai, Pillaiyar et al., "Development of potent dipeptide-type SARS-CoV 3CL protease inhibitors with novel P3 scaffolds: Design, synthesis, biological evaluation, and docking studies.", European Journal of Medicinal Chemistry, (2013), vol. 68 pp. 372-384.

* cited by examiner

*Primary Examiner* — Taofiq A Solola
(74) *Attorney, Agent, or Firm* — Oliff PLC

(57) ABSTRACT

A compound represented by the following general formula (1) that has an activity of suppressing a virus protease and an antiviral activity and has a low toxicity to a host cell:

[Chem. 1]

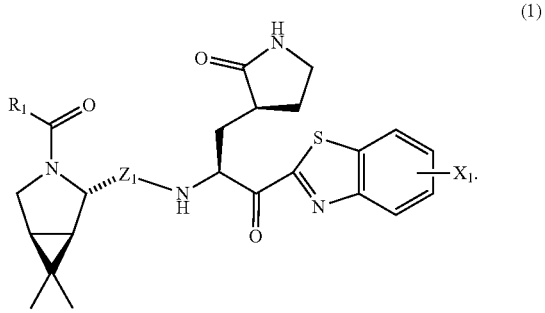

(1)

3 Claims, 3 Drawing Sheets

COMPOUND HAVING BIOLOGICAL ACTIVITY SUCH AS ANTIVIRAL ACTIVITY

TECHNICAL FIELD

The present invention relates a compound exhibiting a biological activity such as an antiviral activity, and an antiviral drug comprising the compound as an active ingredient.

BACKGROUND ART

The infectious disease (COVID-19) of novel coronavirus (SARS-CoV-2), which is considered to have broken out in Wuhan, China, in December 2019, instantly spread across the world, and the total number of infected people all over the world has exceeded 180 million currently in July 2021, and is further increasing. In addition, many cases of COVID-19 infection are either asymptomatic or mildly symptomatic, but severe cases require treatments using respirators, extracorporeal membrane oxygenation (ECMO), and the like. Moreover, the mortality rate is also high, and the total number of deaths has been well over 4 million. In addition, SARS-CoV-2 has already been repeating mutation currently about 1 year after the outbreak (NPL 1), and thus there are concerns about further explosive outbreaks, increase in mortality rate, and the like.

In order to remedy such situations, inoculation of mRNA vaccines and DNA vaccines, which are said to inhibit 90% or more of the onset of COVID-19, was started worldwide. However, it is unclear whether such vaccines can inhibit infection of SARS-CoV-2 itself. In addition, although it is reported that the vaccines maintain their preventive effects for 4 months, it is also unclear whether the effects can be exhibited over a long period of more than 4 months (NPL 2).

Furthermore, since vaccines are prophylactic drugs in general, useful therapeutic drugs have been craved as quickly as possible in order to overcome the pandemic, and the developments of therapeutic drugs for COVID-19 have been earnestly conducted. However, there are cases where a therapeutic drug administered to asymptomatic to mildly symptomatic cases is wishfully and wrongly determined to be "efficacious", and the determination on the efficacy varies among clinical trials. Furthermore, many of these were only made in observational studies but not in double-blind clinical trials, the developments have become even more confused. Moreover, most of the compounds that have been regarded as "candidate drugs for treatment" have been administered before fundamental findings in laboratories and animal experiments are accumulated. In addition, the expectations without solid grounds for the "re-purposing" have facilitated the tendencies.

In addition, in the developments of therapeutic drugs for COVID-19, functional inhibitors for the "SPIKE protein", "ACE2", "RNA-dependent RNA polymerase", and "virus protease" are targeted. Among these, only remdesivir, which is a RNA-dependent RNA polymerase inhibitor, has been approved. Remdesivir was developed as a therapeutic drug for Ebola hemorrhagic fever, which was prevalent in 2014, and has been approved to be applied to COVID-19 as drug repositioning. However, it has been reported that remdesivir has hepatotoxicity and nephrotoxicity, and the use of this is limited to only severe patients. Moreover, the use of remdesivir itself only has a low satisfaction with treatment. Hence, there is a demand for a compound having a low toxicity to patients while exhibiting a high antiviral activity against SARS-CoV-2. In addition, there has been no therapeutic drug developed for COVID-19, which targets the virus protease.

CITATION LIST

Patent Literature

[NPL 1] Francesco Ortuso, a, b et al., "Structural genetics of circulating variants affecting the SARS-CoV-2 spike/human ACE2 complex", J Biomol Struct Dyn. 2021, 1-11

[NPL 2] Polack et al., "Safety and Efficacy of the BNT162b2 m RNA Covid-19 Vaccine", NEJM, issued on Dec. 31 2020, 383, 2603-2615

[NPL 3] Dafydd Owen, "Oral Inhibitors of the SARS-CoV-2 Main Protease for the Treatment of COVID-19", the American Chemical Society Spring 2021 meeting, 2021, presented on April 8

[NPL 4] Pillaiyar Thanigaimalai et al., "Development of potent dipeptide-type SARS-CoV 3CL protease inhibitors with novel P3 scaffolds: Design, synthesis, biological evaluation, and docking studies", Euro J Med Chem., 2013, 68, 372-384

SUMMARY OF INVENTION

Technical Problem

The present invention has been made in view of the above-described problems of the conventional techniques, and has an object to provide a compound that has an activity of suppressing the protease of a virus such as SARS-CoV-2, further has an antiviral activity, and has low toxicity to host cells.

Solution to Problem

The present inventors conducted earnest studies to solve the above-described problems, and consequently Mitsuya who is one of the present inventors, et al. screened up a group of main protease inhibitors, which can be effective against SARS-CoV-2 as well, from the compound library of main protease inhibitors of SARS-CoV (SARS-CoV-1), which became epidemic in 2003, accumulated by themselves. Then, the present inventors prepared and evaluated various derivatives using the inhibitors as lead compounds.

As a result, it was revealed that a compound represented by the following general formula (1) has an activity of suppressing the main protease of SARS-CoV-2, and further exhibits an excellent antiviral activity against the virus.

[Chem. 1]

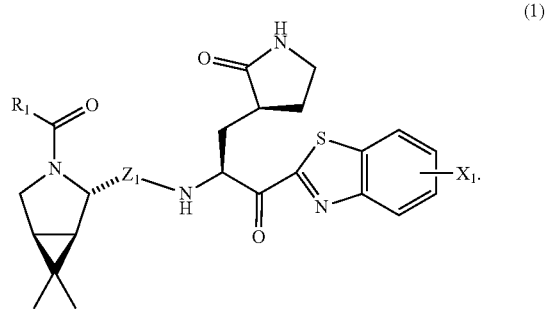

Meanwhile, the compound had a low toxicity to cells that serve as the host of the virus, and further did not exhibit acute or subacute toxicity to small animals such as mice. In addition, it was also found that the compound was favorable in vivo half-life, and had a high bioavailability (BA), which was calculated from the AUC, thus indicating the usefulness as an oral preparation.

In addition, as a result of comparing the compound of the present invention with the Pfizer compound (compound PF-7321332) under clinical trial, which is a main protease inhibitor of SARS-CoV-1, the compound of the present invention was 10 times or more stronger than the Pfizer compound in terms of antiviral activities ($EC_{50}$ and $EC_{99}$).

Moreover, as a result of comparison with another main protease inhibitor of SARS-CoV-1 (compound 2420 (YH-53), NPL 4), it was revealed that the compound of the present invention was significantly more excellent in antiviral activity and in vivo half-life than this.

The present invention is based on the results of above-described studies. Specifically, the present invention relates to a compound exhibiting biological activities such as a virus protease suppressive activity and an antiviral activity, and an antiviral drug comprising the compound as an active ingredient, and more specifically provides the following:

<1> A compound represented by the general formula (1):

[in the formula, $X_1$ represents one or more substituents that can be introduced to a benzothiazole group, and the substituents are each independently selected from a halogen element, a cyclic alkyl group having 3 to 6 carbon atoms, a linear alkyl group having 1 to 6 carbon atoms, a branched alkyl group having 3 to 6 carbon atoms, an aminosulfonyl group, and a methoxy group optionally having a substituent, $Z_1$ represents a carbonyl group or a thiocarbonyl group, $R_1$ represents any one of

[Chem. 2]

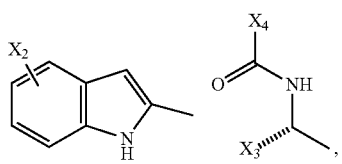

$X_2$ represents one or more substituents that can be introduced to an indole group, and the substituents are each independently selected from a halogen element and a methoxy group optionally having a substituent, $X_3$ represents any one functional group of

[Chem. 3]

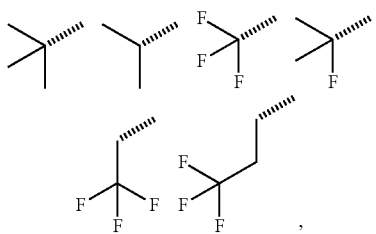

and $X_4$ represents any one functional group of a methyl group

[Chem. 4]

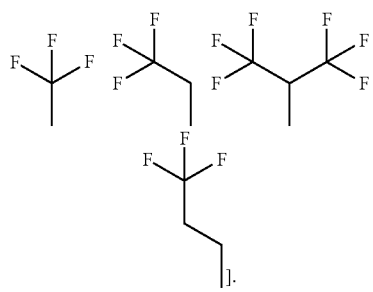

<2> An antiviral drug comprising the compound according to <1> as an active ingredient.

<3> The antiviral drug according to <2>, that is an anti-SARS-CoV-2 virus agent.

Advantageous Effects of Invention

The present invention suppresses the protease activity of a virus such as SARS-CoV-2 and further exhibits an antiviral activity, thus making it possible to treat or prevent the infectious disease of the virus. Meanwhile, since the compound of the present invention has a low toxicity to a host cell, the treatment and the like becomes possible with low side effects. In particular, the compound of the present invention does not exhibit acute or subacute toxicity also to small animals such as rodents. Hence, the compound of the present invention has a wide margin of safety. In addition, the compound of the present invention can have favorable pharmacokinetic parameters such as in vivo half-life and BA. Hence, it also becomes possible to achieve advantageous effects with three oral administrations or less per day.

DESCRIPTION OF EMBODIMENTS (Compound)

Figure 1:
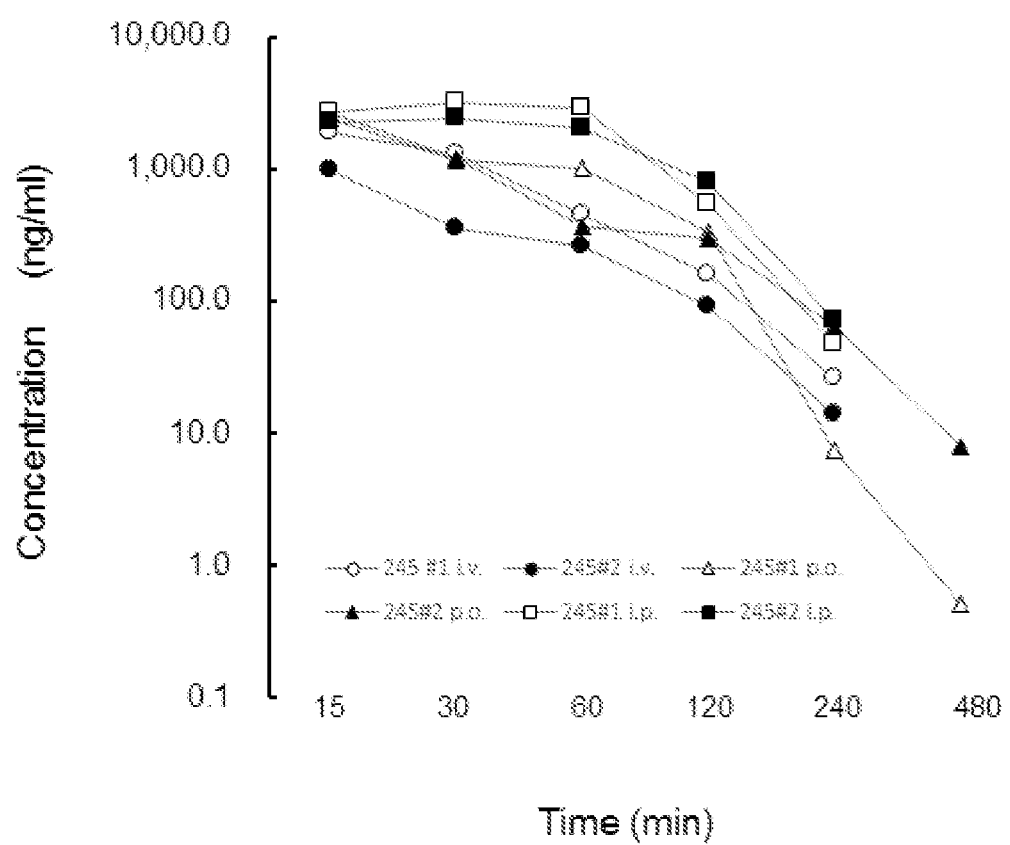
FIG. 1 is a graph showing changes in blood concentration of a compound indicated as No: 245 in Table 1 with time. "I.V.", "P.O.", and "I.P." show changes in blood concentration in mice to which the compound was intravenously administered, orally administered, and intraperitoneally administered, respectively. In addition, "#1", "#2", and the like show that the compound was administered to different multiple individual mice (here, 2 individuals) (the same applies to FIGS. 2 and 3 for the description in the figure).

As indicated in Examples described below, it has been revealed that a compound represented by the following formula has an activity of suppressing the protease of SARS-CoV-2, further has an antiviral activity, and has a low toxicity to host cells. Therefore, the present invention provides a compound represented by the following general formula (1).

[Chem. 5]

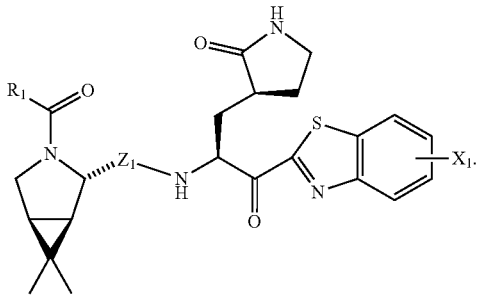
(1)

In the formula, $X_1$ represents one or more substituents that can be introduced to a benzothiazole group, and the substituents are each independently selected from a halogen element, a cyclic alkyl group having 3 to 6 carbon atoms, a linear alkyl group having 1 to 6 carbon atoms, a branched alkyl group having 3 to 6 carbon atoms, an aminosulfonyl group, and a methoxy group optionally having a substituent, $Z_1$ represents a carbonyl group or a thiocarbonyl group, $R_1$ represents any one of

[Chem. 6]

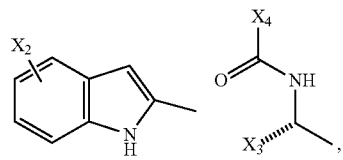

$X_2$ represents one or more substituents that can be introduced to an indole group, and the substituents are each independently selected from a halogen element and a methoxy group optionally having a substituent,

[Chem. 7]

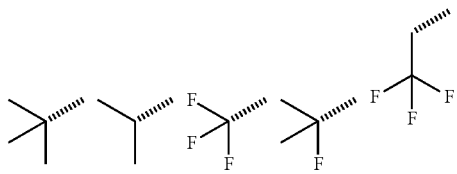

and

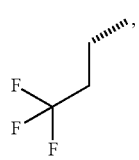

$X_4$ represents any one functional group of

[Chem. 8]

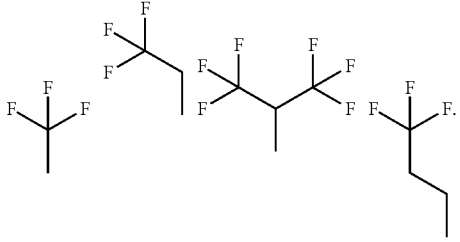

a methyl group

In the present invention, the "halogen atom" means a fluorine atom, a chlorine atom, a bromine atom, or an iodine atom, and is preferably a fluorine atom or a chlorine atom, and more preferably a fluorine atom.

The "cyclic alkyl group having 3 to 6 carbon atoms" includes a cyclopropyl group, a cyclobutyl group, a cyclopentyl group, and a cyclohexyl group, and is preferably a cyclopropyl group.

The "linear alkyl group having 1 to 6 carbon atoms" includes a methyl group, an ethyl group, a n-propyl group, a n-butyl group, a n-pentyl group, and a n-hexyl group, and is preferably a methyl group, an ethyl group, or a propyl group.

The "branched alkyl group having 3 to 6 carbon atoms" includes a 1-methylethyl group (an i-propyl group), a 1-methylpropyl group (a s-butyl group), a 1,1-dimethylethyl group (a t-butyl group), a 2-methylpropyl group (an i-butyl group), a 1-methylbutyl group, a 2-methylbutyl group, 3-methylbutyl group, a 1-ethylpropyl group, a 1,1-dimethylpropyl group, a 1,2-dimethylpropyl group, a 2,2-dimethylpropyl group, a 1-methylpentyl group, a 2-methylpentyl group, a 3-methylpentyl group, a 4-methylpentyl group, a 1-ethylbutyl group, a 2-ethylbutyl group, a 1,1-dimethylbutyl group, a 1,2-dimethylbutyl group, a 1,3-dimethylbutyl group, a 2,2-dimethylbutyl group, a 2,3-dimethylbutyl group, a 3,3-dimethylbutyl group, a 1,1,2-trimethylpropyl group, a 1-ethyl-1-methylpropyl group, and a 1-ethyl-2-methylpropyl group, and is preferably a branched alkyl group having 3 to 4 carbon atoms (an i-propyl group, a s-butyl group, a t-butyl group, or an i-butyl group), and more preferably an i-butyl group.

Note that the "carbon atoms" represent the number of carbon atoms of a group serving as a mother nucleus. That is, this number of carbon atoms does not include the number of carbon atoms in a substituent. This is used in the same meaning below in the Specification.

The "aminosulfonyl group" is not particularly limited, but includes, for example, an aminosulfonyl group, a methylaminosulfonyl group, a cyclopropylaminosulfonyl group, a dimethylaminosulfonyl group, and a dicyclopropylaminosulfonyl group.

In the present invention, the "substituent" which the methoxy group, or a linear alkyl group having 1 to 6 carbon atoms or a branched alkyl group having 3 to 6 carbon atoms which are described later can have is not particularly limited, and is not particularly limited as long as the substituent is chemically acceptable and allows the activities described later to be exhibited. The substituent includes, for example, halogen atoms such as a chlorine atom, a fluorine atom, a bromine atom, and an iodine atom (halogeno groups such as a chloro group, a fluoro group, a bromo group, and an iodo group); a hydroxy group; alkoxy groups having 1 to 6 carbon atoms such as a methoxy group, an ethoxy group, a n-propoxy group, an i-propoxy group, a n-butoxy group, a s-butoxy group, an i-butoxy group, and a t-butoxy group; a cyano group; an amino group; and alkyl groups having 1 to 10 carbon atoms such as a methyl group, an ethyl group, a n-propyl group, an i-propyl group, a n-butyl group, a s-butyl group, an i-butyl group, a t-butyl group, a n-pentyl group, a n-hexyl group, a n-heptyl group, a n-octyl group, a n-nonyl group, and a n-decyl group. In addition, in these "substituents", any hydrogen atom in the substituent may be optionally substituted with a group having a different structure. In addition, the "substituent" which the methoxy group can have is preferably a halogen element (more preferably, fluorine). In addition, a preferable example of the "methoxy group having a substituent" includes a trifluoromethoxy group.

The number of substituents ($X_1$) to be introduced to the benzothiazole group is not particularly limited as long as they can be introduced, and may be one or more (for example, 2, 3, or 4). In addition, in the case where a plurality of substituents are introduced, the types of all the substituents may be the same, or some or all of the substituents may be different. The position to which the substituent is introduced is not particularly limited, but is preferably at least one position selected from position 4, position 5, position 6, and position 7. More specifically, a substituent may be introduced to one position or two positions selected from position 4, position 5, position 6, and position 7, but it is more preferable that one substituent be introduced to position 4, position 5, or position 6, or two substituents be introduced to position 4 and position 7. Note that the numbers of the positions in the benzothiazole group are as indicated in the chemical formula shown below.

In addition, the substituent ($X_1$) to be introduced to the benzothiazole group is each independently selected from a cyclic alkyl group having 3 to 6 carbon atoms, a linear alkyl group having 1 to 6 carbon atoms, a branched alkyl group having 3 to 6 carbon atoms, an aminosulfonyl group, a methoxy group optionally having a substituent, and a halogen element, and specific examples thereof are as described above. It is preferable that at least one halogen element be introduced, and it is more preferable that at least one fluorine atom or chlorine atom be introduced, and it is further preferable that at least one fluorine atom be introduced.

[Chem. 9]

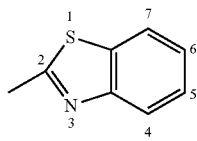

In the compound represented by the general formula (1) of the present invention, $R_1$ may take a form of an indole group optionally having a substituent. The number of substituents ($X_2$) to be introduced to the indole group is not particularly limited as long as they can be introduced, and may be one or more (for example, 2, 3, or 4). In addition, in the case where a plurality of substituents are introduced, the types of the substituents may be the same, or some or all of substituents may be different. The position to which the substituent is introduced is not particularly limited, but is preferably at least one position selected from position 4, position 5, position 6, and position 7. More specifically, one substituent may be introduced to position 4 or two substituents may be introduced to position 4 and position 5, position 4 and position 6, or position 4 and position 7. It is more preferable that two substituents be introduced to position 4 and position 7. Note that the numbers of the positions in the indole group are as indicated in the chemical formula shown below.

In addition, the substituent ($X_2$) to be introduced to the indole group is each independently selected from a methoxy group optionally having a substituent and a halogen element, and specific examples thereof are as described above. It is preferable that at least two substituents be introduced, and it is more preferable that two halogen elements be introduced, or one halogen element and one methoxy group optionally having a substituent be introduced, and it is further preferable that two fluorine atoms be introduced, or one fluorine atom and one toxy group be introduced. In particular, in the compound of the present invention, it is desirable that at least two substituents be introduced to the indole group as described above.

[Chem. 10]

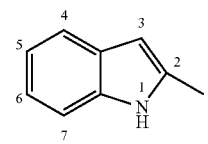

In addition, in the present invention, $R_1$ may take a form of an amide methyl group having $X_3$ and $X_4$ described below besides the above-described indole group optionally having a substituent.

[Chem. 11]

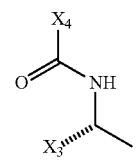

Here, $X_3$ represents a branched alkyl group having 3 to 6 carbon atoms which may optionally have a substituent, more specifically is selected from the following functional groups, and among these, is preferably one of a t-butyl group, a 1-methyl-1-fluoroethyl group, and a 2,2,2-trifluoroethyl group.

[Chem. 12]

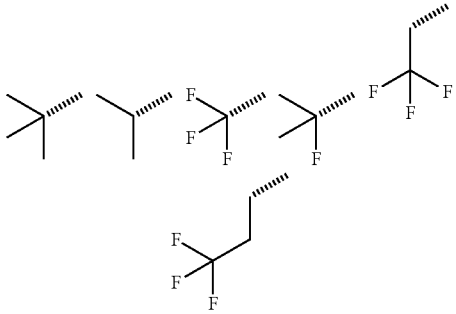

X4 represents a linear alkyl group having 1 to 6 carbon atoms which may optionally have a substituent or a branched alkyl group having 3 to 6 carbon atoms which may optionally have a substituent, more specifically is selected from the following functional groups, and among these, is preferably a trifluoromethyl group.

[Chem. 13]

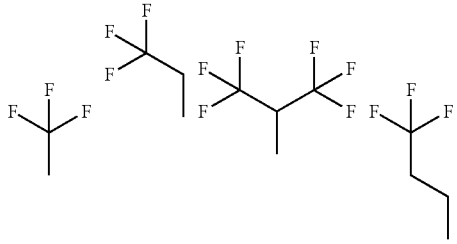

a methyl group

Although examples of the functional groups in the compound of the present invention have been described above, it is preferable that in the compound of the present invention, the functional groups take combinations described below from the viewpoint of exhibiting higher protease suppressive activity and antiviral activity described below and further lowering the cytotoxicity.

A combination in which $X_1$ is a substituent (more preferably a halogen element, and further preferably a fluorine atom) to be introduced to position 4 of a benzothiazole group, $Z_1$ is a carbonyl group or a thiocarbonyl group, $R_1$ is an indole group having $X_2$, and $X_2$ are substituents to be introduced to position 4 and position 7 of the indole group (more preferably halogen elements at both position 4 and position 7 (further preferably both fluorine atoms), or more preferably a halogen element at one of position 4 and position 7 and a methoxy group at the other (further preferably a halogen element at position 4 and a methoxy group at position 7, particularly preferably a fluorine atom at position 4 and a methoxy group at position 7)); or a combination in which $X_1$ is a substituent (more preferably a halogen element, and further preferably a fluorine atom) to be introduced to position 4, position 5, or position 6 of a benzothiazole group, $Z_1$ is a carbonyl group or a thiocarbonyl group, $R_1$ is an amide methyl group having $X_3$ and $X_4$, $X_3$ is a t-butyl group, and $X_4$ is a trifluoromethyl group.

Specific forms of such combinations include the following compounds which are described in Examples described below.

[Chem. 14]

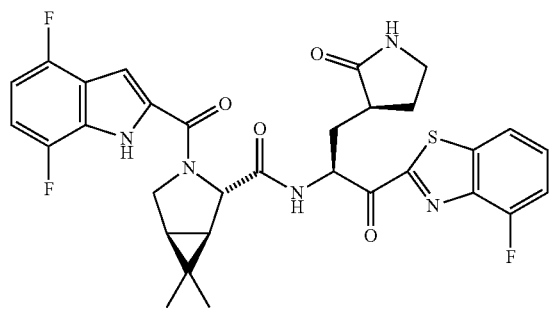

243

-continued

[Chem. 15]

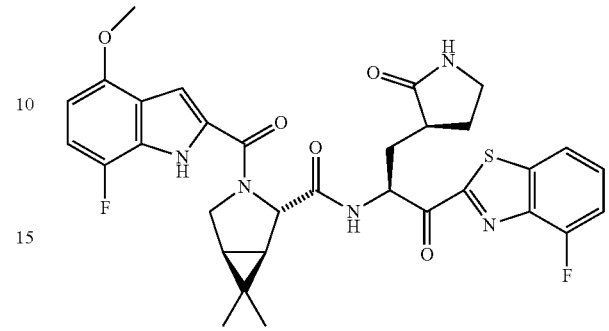

244

[Chem. 16]

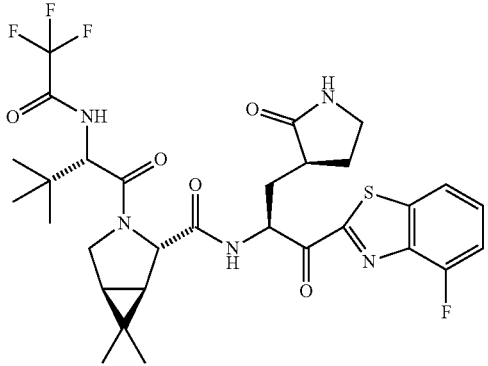

245

[Chem. 17]

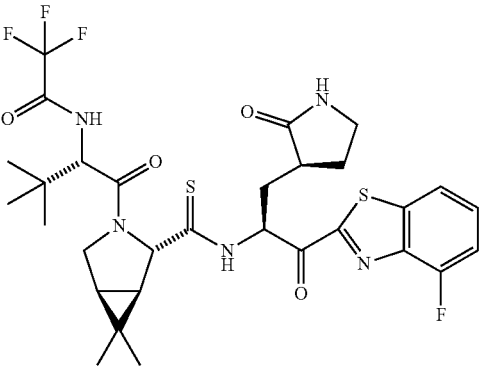

245S

-continued

[Chem. 18]

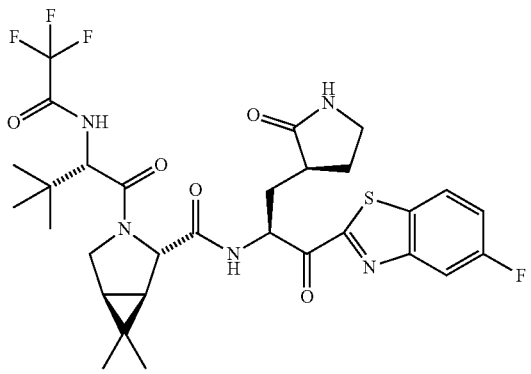

272

[Chem. 19]

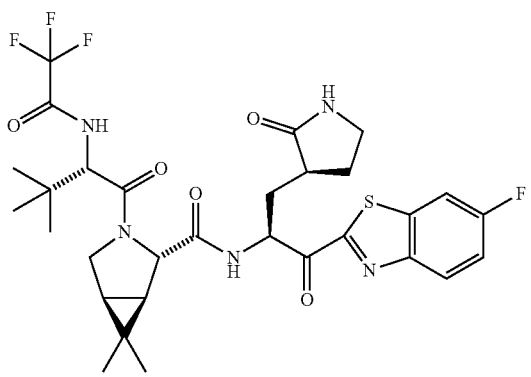

273

In addition, the compound of the present invention also includes a pharmacologically acceptable salt, hydrate, or solvate. Such a pharmacologically acceptable salt is not particularly limited, and may be selected as appropriate depending on the structure of the compound, and the like, and includes, for example, acid addition salts (hydrochloride, sulfate, hydrobromide, nitrate, hydrogen sulfate, phosphate, acetate, lactate, succinate, citrate, maleate, hydroxymaleate, tartrate, fumarate, methanesulfonate, p-toluenesulfonate, camphor sulfonate, sulfamate, mandelate, propionate, glycolate, stearate, malate, ascorbate, pamoate, phenylacetate, glutamate, benzoate, salicylate, sulfanilate, 2-acetoxybenzoate, ethane disulfonate, oxalate, isethionate, formate, trifluoroacetate, ethyl succinate, lactobionate, gluconate, glucoheptonate, 2-hydroxyethanesulfonate, benzenesulfonate, lauryl sulfate, aspartate, adipate, hydriodide, nicotinate, oxalate, picrate, thiocyanate, undecanoate, and the like), and base addition salts (sodium salt, potassium salt, zinc salt, calcium salt, bismuth salt, barium salt, magnesium salt, aluminum salt, copper salt, cobalt salt, nickel salt, cadmium salt, ammonium salt, ethylenediamine salt, and N-dibenzylethylenediamine salt). In addition, the hydrate or solvate is not particularly limited, and includes, for example, one in which 0.1 to 3 molecules of water or a solvent are added per molecule of the compound or its salt.

The compound of the present invention encompasses all isomers such as tautomers, geometric isomers, optical isomers based on asymmetric carbons, and stereoisomers, and isomeric mixtures. Furthermore, the compound of the present invention also encompasses compounds which are derived from the compound of the present invention by in vivo metabolism such as oxidation, reduction, hydrolysis, amination, deamination, hydroxylation, phosphorylation, dehydroxylation, alkylation, dealkylation, or conjugation but which can still exhibit the desired activity. In addition, the present invention also encompasses compounds which produce the compound of the present invention when undergoing in vivo metabolism such as oxidation, reduction, or hydrolysis (in the form of so-called prodrugs). Furthermore, the compound of the present invention can be pharmaceutically formulated in accordance with a publicly-known pharmaceutical method, as described later.

In addition, methods for synthesizing the compound of the present invention are described in detail in Examples described later. Thus, a person skilled in the art can synthesize the compound of the present invention by selecting a reaction raw material, a reaction reagent, reaction conditions (for example, a solvent, a reaction temperature, a catalyst, and a reaction time), and the like as appropriate, and by adding a modification or a reformation to these methods as necessary, with reference to the description in Examples. In addition, the compound synthesized in this way can be isolated or purified by using, as appropriate, any one or a combination of common methods used for isolating and purifying compounds (reversed phase chromatography, ion exchange chromatography, adsorption chromatography, a recrystallization method, and the like).

In addition, the compound of the present invention has a protease suppressive activity and an antiviral activity.

In the present invention, the "protease suppressive activity" means an activity of suppressing the activity of a protease (for example, SARS main protease (3CL protease, or an enzyme specified by EC 3.4.22.69)) produced by a virus such as SARS-CoV-2. Such an activity can be evaluated by using the $IC_{50}$ value which is calculated with the degree of suppression against the binding of the protease and the substrate as an index, as shown in Test Example 1 of Examples described later. The $IC_{50}$ value of the anti-protease suppressive activity of the compound of the present invention is preferably less than 1 µM, and more preferably less than 0.3 µM.

In the present invention, the "antiviral activity" means an activity, in a cell (host cell) infected with a virus such as SARS-CoV-2, to eliminate the virus or suppress the proliferation of the virus, and includes, for example, an activity of suppressing viral replication in a host cell. Such an activity can be evaluated by using the $EC_{50}$ value which is calculated with the number of viruses replicated in the host cell or the like as an index, and, for example, the anti-SARS-CoV-2 activity can be evaluated by using a measured value after the administration of a test compound, which can be obtained by a method described in Test Example 2 shown in Examples described later. The $EC_{50}$ value of the antiviral activity of the compound of the present invention is preferably less than 1 µM, more preferably less than 0.4 µM, further preferably less than 0.1 µM, more preferably less than 0.05 µM, and further preferably less than 0.01 µM. The $EC_{99}$ value, which indicates almost 100% antiviral activity, is preferably less than 5 µM, and more preferably less than 1 µM.

Note that in the present invention, the "suppression" means not only partial suppression but also complete suppression (inhibition).

In addition, the compound of the present invention has a low cytotoxicity. In the present invention, the "cytotoxicity" means an activity to kill a cell, suppress the function of the cell, or suppress the proliferation of the cell. Such an activity can be evaluated by using the $CC_{50}$ value which is calculated with the number of survived host cells (for example, Vero E6 cells) which can be infected with a virus or the like as an index, as shown in Test Example 3 of Examples described later. The $CC_{50}$ value of the compound of the present invention is preferably 10 μM or more, more preferably 50 μM or more, further preferably 80 μM or more, and more preferably 100 μM or more.

Furthermore, it is preferable that the compound of the present invention have favorable pharmacokinetic parameters. Here, "pharmacokinetic parameters" include, for example, the in vivo half-life ($T_{1/2}$) and the bioavailability (BA: an index indicating how much of a drug administered enters systemic circulation, as shown in Test Example 4 of Example described later. In addition, as the "favorable pharmacokinetic parameters", for example, the $T_{1/2}$ of the compound of the present invention is preferably 20 minutes or more from the viewpoint of keeping three administrations or less per day, and the $T_{1/2}$ of the compound of the present invention is more preferably 45 minutes or more from the viewpoint of keeping three administrations or less per day, in order to mitigate the burden on the administration target (that is, a patient or the like). In addition, similarly, BA is preferably 20% or more, more preferably 30% or more, further preferably 40% or more, more preferably 50% or more, further preferably 60% or more, more preferably 70% or more, further preferably 80% or more, and more preferably 90% or more, from the viewpoint of keeping low the number of times of oral administration per day.

(Antiviral Drug, Method for Preventing Viral Infectious Disease, Treatment Method)

As shown in Examples described later, the compound of the present invention has an antiviral activity and the like. Hence, it is possible to provide an antiviral drug comprising the compound of the present invention as an active ingredient.

The virus targeted by the present invention is not particularly limited, and may be an RNA virus or a DNA virus, but is preferably a virus that has a main protease (3CL protease, an enzyme specified by EC 3.4.22.69) as described above, and is more preferably SARS-CoV-2. Note that as shown in NPL 1, SARS-CoV-2 has already been repeating mutation. The present invention desirably targets at least SARS-CoV-2 of the initial genotype, but can also target more variants.

In addition, the infectious disease targeted by the present invention is not particularly limited, but includes, for example, SARS-CoV-2 infectious disease (novel coronavirus infectious disease, COVID-19), and all of mild, moderate, severe cases of SARS-CoV-2 infectious disease can be targeted by the present invention regardless of the degree of symptoms.

The compound of the present invention can be pharmaceutically formulated in accordance with a publicly-known pharmaceutical method. For example, the compound of the present invention can be used orally or parenterally in any of the forms of capsule, tablet, pill, liquid, powder, granule, fine granule, film coating agent, pellet, troche, sublingual tablet, masticatory, buccal, paste, syrup, suspension, elixir, emulsion, liniment, ointment, plaster, gel patch, transdermal medication patch, lotion, inhalant, aerosol, injection, suppository, and the like.

In these pharmaceutical formulations, the compound of the present invention can be combined with any of pharmacologically acceptable carriers or media, specifically including sterile water, saline, vegetable oils, solvents, bases, emulsifiers, suspensions, surfactants, stabilizers, flavoring agents, fragrance, excipients, vehicles, antiseptics, binders, diluents, tonicity agents, soothing agents, bulking agents, disintegrants, buffering agents, coating agents, lubricants, colorants, sweeteners, thickeners, flavoring agents, solubilizers, or other additives, and the like. More specifically, the carriers include solid carriers such as lactose, kaolin, sucrose, crystalline cellulose, corn starch, talc, agar, pectin, stearic acid, magnesium stearate, lecithin, and sodium chloride and liquid carriers such as glycerin, peanut oil, polyvinylpyrrolidone, olive oil, ethanol, benzyl alcohol, propylene glycol, and water.

In addition, the compound of the present invention may be used in combination with any of other publicly-known antiviral drugs. In the case where the target disease is SARS-CoV-2 infectious disease, such publicly-known antiviral drugs include, for example, RNA-dependent RNA polymerase inhibitors (remdesivir and the like), DNA-dependent RNA polymerase inhibitors (reverse transcriptase inhibitors), SPIKE functional inhibitors, ACE2 antagonists, and other SARS-CoV-2 protease inhibitors different from the compound of the present invention.

The preferable mode of administration of the antiviral drug of the present invention is not particularly limited, but may be oral administration or parenteral administration. In addition, the parenteral administration more specifically includes intravenous administration, intraarterial administration, intraperitoneal administration, subcutaneous administration, intradermal administration, tracheobronchial administration, rectal administration, intramuscular administration, and administration by infusion.

The antiviral drug of the present invention can be used mainly for humans, but may also be used for animals other than humans, such as laboratory animals.

In the case of administering the antiviral drug of the present invention, the dosage is selected as appropriate depending on the age, body weight, symptom, health condition, seriousness, drug tolerability of the subject, the mode of administration, and the like. The dosage of the antiviral drug of the present invention per day in terms of the amount of the compound as the active ingredient is normally 0.00001 to 1000 mg/kg body weight, and preferably 0.0001 to 100 mg/kg body weight, and the antiviral drug of the present invention is administered to the subject in one or more divided dosages.

A product or its instruction of the antiviral drug of the present invention may be one to which a statement that the antiviral drug is for use in treating or preventing the viral infectious disease is attached. Here, "to attach a statement to the product or its instruction" means that the statement is attached to the product itself, a container, a package, or the like, or that the statement is attached to an instruction, a package insert, an advertisement, another printed matter, or the like which discloses information on the product. In addition, a statement that the antiviral drug is for use in treating a viral infectious disease may also contain, as information on the mechanism of action of the antiviral drug of the present invention, information that when administered, the compound of the present invention can suppress the protease activity of the virus to suppress replication of the virus.

In this way, the present invention makes it possible to prevent or treat an infectious disease by administering the antiviral drug of the present invention to the subject. Thus, the present invention also provides a method for preventing or treating a viral infectious disease, comprising administering the compound of the present invention.

The subjects to which the compound of the present invention is to be administered are not particularly limited, and include individuals who are affected with a viral infectious disease, virus carriers who have not developed the infectious disease yet, individuals who have not been infected yet, and the like. For example, the subjects may be not only those who are infected with the SARS-CoV-2 infectious disease, but also those who are not infected (uninfected), or may be those who have already recovered from the SARS-CoV-2 infectious disease. More specifically, the compound of the present invention may be administered when symptoms (fever, cough, taste disorder, smelling disorder, and the like) of the SARS-CoV-2 infectious disease are observed, and when close contact with an individual infected with SARS-CoV-2 is confirmed.

In addition, in the present invention, the "treatment" includes not only complete recovery from an infectious disease, but also alleviation or improvement of the symptoms and suppression of the progress. The "prevention" includes suppression or delay of an infection or suppression or delay of the onset of the infection.

EXAMPLES

Hereinafter, the present invention will be described in more detail based on Examples; however, the present invention is not limited to Examples below. In Examples, compounds shown below were synthesized. Then, these compounds were subjected to tests described below to evaluate in terms of various activities.

TABLE 1

| Compound No. | X1 | Z1 | R1 | X2 | X3 | X4 |
|---|---|---|---|---|---|---|
| 243 | Fluorine (position 4) | Carbonyl group | Indole group | Fluorine (position 4) Fluorine (position 7) | — | — |
| 244 | Fluorine (position 4) | Carbonyl group | Indole group | Fluorine (position 4) Fluorine (position 7) | — | — |
| 245 | Fluorine (position 4) | Carbonyl group | Amide methyl group | — | t-Butyl group | Trifluoro methyl group |
| 245S | Fluorine (position 4) | Thio-carbonyl group | Amide methyl group | — | t-Butyl group | Trifluoro methyl group |
| 247 | Fluorine (position 4) Fluorine (position 7) | Carbonyl group | Amide methyl group | — | t-Butyl group | Trifluoro methyl group |
| 247S | Fluorine (position 4) Fluorine (position 7) | Thio-carbonyl group | Amide methyl group | — | t-Butyl group | Trifluoro methyl group |
| 248 | Fluorine (position 4) | Carbonyl group | Amide methyl group | — | 2,2,2-Trifluoro ethyl group | Trifluoro methyl group |
| 248S | Fluorine (position 4) | Thio-carbonyl group | Amide methyl group | — | 2,2,2-Trifluoro ethyl group | Trifluoro methyl group |
| 249 | Fluorine (position 4) | Carbonyl group | Amide methyl group | — | 3,3,3-Trifluoro propyl group | Trifluoro methyl group |
| 249S | Fluorine (position 4) | Thio-carbonyl group | Amide methyl group | — | 3,3,3-Trifluoro propyl group | Trifluoro methyl group |
| 250 | Fluorine (position 4) | Carbonyl group | Amide methyl group | — | 1-Methyl-1-flouro-ethyl group | Trifluoro methyl group |
| 250S | Fluorine (position 4) | Thio-carbonyl group | Amide methyl group | — | 1-Methyl-1-flouro-ethyl group | Trifluoro methyl group |
| 251 | Fluorine (position 4) Fluorine (position 7) | Carbonyl group | Amide methyl group | — | 1-Methyl-1-flouro-ethyl group | Trifluoro methyl group |
| 251S | Fluorine (position 4) Fluorine (position 7) | Thio-carbonyl group | Amide methyl group | — | 1-Methyl-1-flouro-ethyl group | Trifluoro methyl group |
| 252 | Fluorine (position 4) Fluorine (position 7) | Carbonyl group | Amide methyl group | — | Trifluoro-methyl group | Trifluoro methyl group |
| 252S | Fluorine (position 4) Fluorine (position 7) | Thio-carbonyl group | Amide methyl group | — | Trifluoro methyl group | Trifluoro methyl group |
| 253 | Fluorine (position 4) Fluorine (position 7) | Carbonyl group | Amide methyl group | — | 2,2,2-Trifluoro ethyl group | Trifluoro methyl group |
| 253S | Fluorine (position 4) Fluorine (position 7) | Thio-carbonyl group | Amide methyl group | — | 2,2,2-Trifluoro ethyl group | Trifluoro methyl group |
| 254 | Fluorine (position 4) Fluorine (position 7) | Carbonyl group | Amide methyl group | — | 3,3,3-Trifluoro propyl group | Trifluoro methyl group |
| 254S | Fluorine (position 4) Fluorine (position 7) | Thio-carbonyl group | Amide methyl group | — | 3,3,3-Trifluoro propyl group | Trifluoro methyl group |
| 272 | Fluorine (position 5) | Carbonyl group | Amide methyl group | — | t-Butyl group | Trifluoro methyl group |
| 273 | Fluorine (position 6) | Carbonyl group | Amide methyl group | — | t-Butyl group | Trifluoro methyl group |

Note that each functional group shown in Table 1 corresponds to the following general formula.

[Chem. 20]

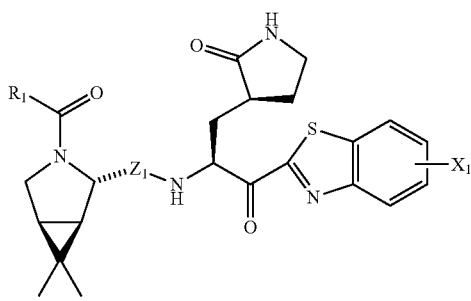

(1)

In addition, $R_1$ represents an indole group optionally having one or more substituents ($X_2$), or an amide methyl group having $X_3$ and $X_4$.

[Chem. 21]

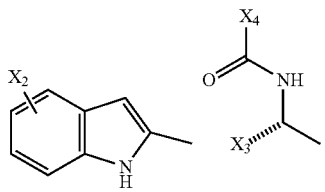

First, representative examples of the methods for synthesizing these compounds will be described below. Note that reactions using a reagent which is sensitive to air or moisture were conducted in a dried glassware in a nitrogen or argon atmosphere using a commercially-available solvent and reagent unless otherwise noted.

In addition, in the analysis of the obtained compounds, thin-layer chromatography (TLC) was developed on Merck 60 F254 pre-coated silica gel, and visualized by fluorescence quenching using ultraviolet light or staining using molybdenum phosphate, para-anisaldehyde, or ninhydrin.

The flash column chromatography was conducted using Silica gel 60N (Kanto Chemical Co., Inc.) or Isolera One (Biotage) equipped with SNAP Ultra Silica Cartridge.

The $^1$H NMR (400 or 500 MHz) and $^{13}$C NMR (100 or 125 MHz) spectra were measured using Bruker Avance II spectrometer, Bruker AVANCE 500 spectrometer, or JEOL JNM-ECA500. The chemical shifts were detected as δ (ppm) relative to CDCl$_3$ ($^1$H 7.26 ppm, $^{13}$C 77.16 ppm) MeOD ($^1$H 3.31 ppm), or dimethyl sulfoxide (DMSO)-d6 ($^1$H 2.50 ppm, $^{13}$C 39.52 ppm).

The low resolution and high resolution mass spectrometry spectra (LRMS, HRMS) were recorded using Bruker Daltonics micrOTOF focus (electrospray ionization mass spectrometry) spectrometer at the cation or anion detection mode.

The reversed-phase high-performance liquid chromatography (HPLC) was conducted by detecting an effluent with ultraviolet light of 220 nm using Cosmosil 5C$_{18}$-ARII preparative column (20×250 mm, Nacalai Tesque Inc.) (flow speed 10.0 mL/min) and Cosmosil 5C$_{18}$-AR II analysis column (4.6×250 mm, Nacalai Tesque Inc.) (flow speed 1.0 mL/min). A solvent system containing 0.1% (v/v) TFA/H$_2$O (solvent A) and 0.1% (v/v) TFA/MeCN (solvent B) was used in elution for the reversed-phase HPLC.

The normal-phase HPLC was obtained by conducting elution with hexane and isopropanol and detecting the effluent with ultraviolet light of 220 nm using CHIRALPAK IC analysis column (4.6×250 mm, Daicel Corporation) and CHIRALPAK IC semi-preparative column (10×250 mm, Daicel Corporation).

(Synthesis Example 1) Synthesis of (1R,2S,5S)-3-(4,7-difluoro-1H-indole-2-carbonyl)-N—((S)-1-(4-fluorobenzo[d]thiazol-2-yl)-1-oxo-3-((S)-2-oxopyrrolidin-3-yl)propan-2-yl)-6,6-dimethyl-3-azabicyclo[3.1.0]hexane-2-carboxamide (No: 243)

In order to synthesize a compound (TKB0243) indicated as No: 243 in Table 1 and represented by the following formula, Methyl (1R,2S,5S)-3-(4,7-difluoro-1H-indole-2-carbonyl)-6,6-dimethyl-3-azabicyclo[3.1.0]hexane-2-carboxylate (HNK0502) was first synthesized in steps shown below.

[Chem. 22]

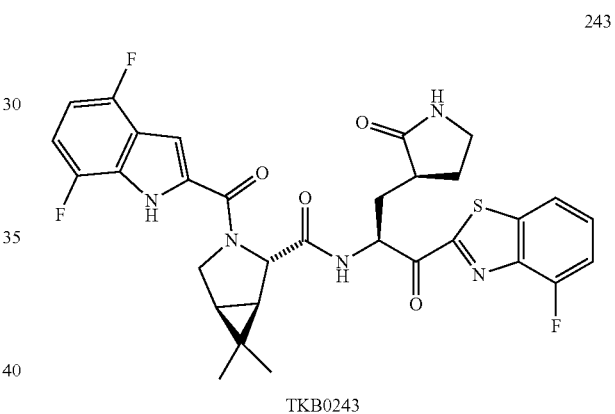

243

TKB0243

[Chem. 23]

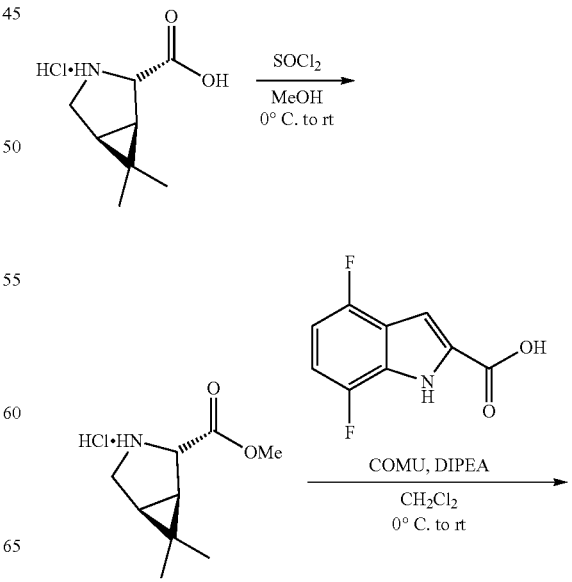

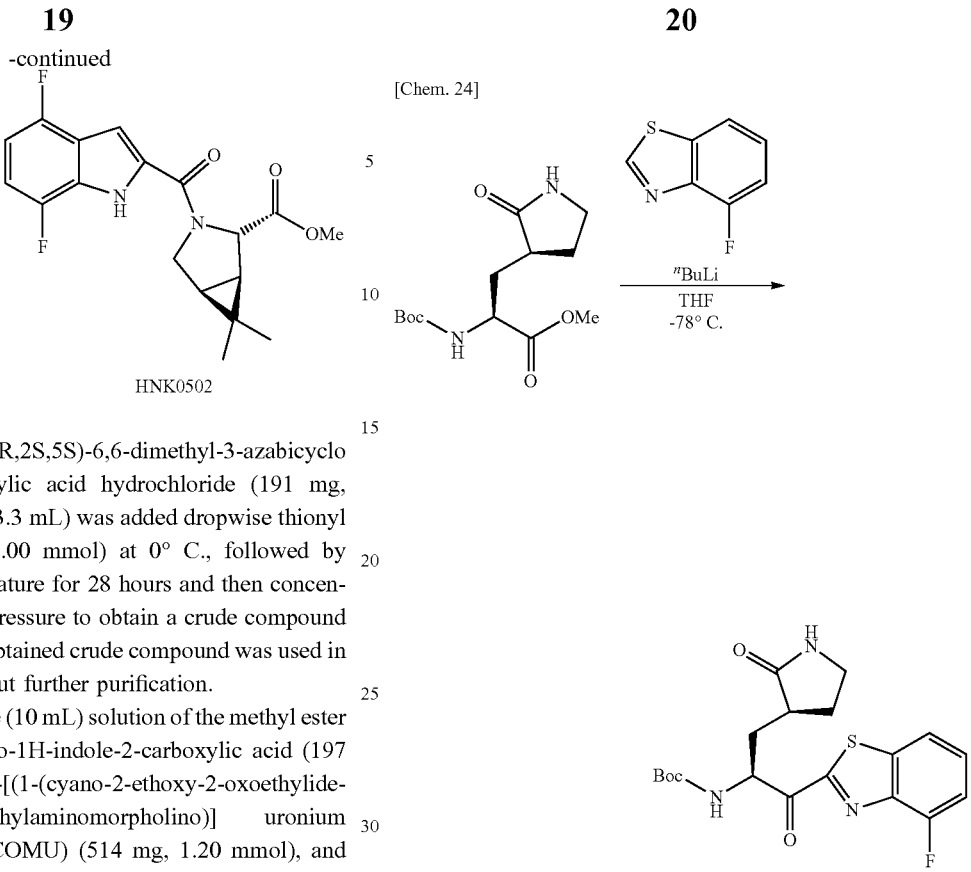

HNK0502

To a solution of (1R,2S,5S)-6,6-dimethyl-3-azabicyclo[3.1.0]hexane-2-carboxylic acid hydrochloride (191 mg, 1.00 mmol)/methanol (3.3 mL) was added dropwise thionyl chloride (0.290 mL, 4.00 mmol) at 0° C., followed by stirring at room temperature for 28 hours and then concentrating under reduced pressure to obtain a crude compound of a methyl ester. The obtained crude compound was used in the next reaction without further purification.

To a dichloromethane (10 mL) solution of the methyl ester were added 4,7-difluoro-1H-indole-2-carboxylic acid (197 mg, 1.00 mmol), 1-[(1-(cyano-2-ethoxy-2-oxoethylideneaminooxy) dimethylaminomorpholino)] uronium hexafluorophosphate (COMU) (514 mg, 1.20 mmol), and N,N-diisopropylethylamine (DIPEA) (0.510 mL, 3.00 mmol) at 0° C., followed by stirring at room temperature for 17 hours. To the reaction liquid was added saturated aqueous ammonium chloride to stop the reaction, followed by extracting with dichloromethane, washing the organic phase with saturated saline, then drying over anhydrous magnesium sulfate, and concentrating at reduced pressure. The residue was purified by silica gel flash column chromatography using hexane-ethyl acetate (4:1) as a developing solvent to obtain HNK0502 (180 mg, 54%, a mixture of rotamers) as a light yellow solid.

$^1$H NMR (400 MHz, CDCl$_3$) δ 10.51 (s, 0.1H), 10.23 (s, 0.9H), 7.05-7.01 (m, 1H), 6.89-6.78 (m, 1H), 6.68-6.59 (m, 1H), 4.84 (s, 0.1H), 4.77 (s, 0.9H), 4.22 (dd, J=10.1 Hz and 5.4 Hz, 1H), 4.07 (d, J=10.1 Hz, 0.1H), 3.99 (d, J=10.1 Hz, 0.9H), 3.76 (s, 2.7H), 3.75 (s, 0.3H), 1.69-1.62 (m, 1H), 1.56-1.48 (m, 1H), 1.08 (s, 3H), 0.99 (s, 0.3H), 0.96 (s, 2.7H);

$^{13}$C NMR (125 MHz, CDCl$_3$) δ 171.9, 159.8, 152.9 (dd, J=245.0 Hz and 2.7 Hz), 145.9 (dd, J=242.2 Hz and 3.2 Hz), 130.8, 126.1 (dd, J=16.3 Hz and 10.5 Hz), 120.2, (dd, J=24.6 Hz and 5.2 Hz)109.0 (dd, J=19.0 Hz and 8.4 Hz), 104.2 (dd, J=21.6 Hz and 6.3 Hz), 102.8, 61.0, 52.6, 48.6, 29.9, 28.2, 26.2, 19.7, 12.7;

HRMS (ESI), m/z calcd for C$_{18}$H$_{19}$F$_2$N$_2$O$_3$ [M+H]$^+$ 349.1358, found 349.1355.

Meanwhile, tert-Butyl ((S)-1-(4-fluorobenzo[d]thiazol-2-yl)-1-oxo-3-((S)-2-oxopyrrolidin-3-yl)propan-2-yl)carbamate (CAZ1333) was synthesized by the reaction shown below.

[Chem. 24]

CAZ1333

To a solution of 4-fluorobenzothiazole (766 mg, 5.00 mmol)/tetrahydrofuran (9.0 mL) was added dropwise n-butyllithium (1.60M hexane solution, 2.81 mL, 4.50 mmol) at −78° C. over 15 minutes. After stirring for 1 hour, a solution of methyl ester compound 1 (286 mg, 1.00 mmol)/tetrahydrofuran (1.0 mL) was added dropwise over 20 minutes, followed by further stirring for 3 hours. To the reaction liquid was added saturated aqueous ammonium chloride to stop the reaction, followed by further stirring at 0° C. for 20 minutes. The mixture liquid was concentrated under reduced pressure, and then extracted by adding ethyl acetate. The organic phase was washed with saturated saline, dried over anhydrous magnesium sulfate, and concentrated under reduced pressure. The residue was purified by silica gel flash column chromatography using chloroform-methanol (40:1) as a developing solvent to obtain CAZ1333 (338 mg, 83%) a brown solid.

$^1$H NMR (500 MHz, CDCl$_3$) δ 7.76-7.74 (m, 1H), 7.53-7.49 (m, 1H), 7.27-7.24 (m, 1H), 6.03 (s, 1H), 5.84-5.82 (m, 1H), 5.61 (m, 1H), 3.42-3.39 (m, 2H), 2.70-2.62 (m, 2H), 2.23-2.08 (m, 3H), 1.44 (s, 9H);

$^{13}$C NMR {1H} (125 MHz, CDCl$_3$) δ 193.1, 179.8, 164.3, 157.4 (d, J=261.1 Hz), 142.9 (d, J=14.0 Hz), 139.8 (d, J=2.4 Hz), 129.1 (d, J=7.1 Hz), 118.3 (d, J=4.5 Hz), 112.6 (d, J=17.5 Hz), 80.2, 55.6, 40.6, 38.7, 34.7, 28.4 (3C), 28.0;

HRMS (ESI), m/z calcd for C$_{19}$H$_{23}$FN$_3$O$_4$S [M+H]$^+$ 408.1388, found 408.1384.

Next, from the compounds HNK0502 and CAZ1333 obtained as described above, TKB0243 was synthesized by the reactions shown below.

[Chem. 25]

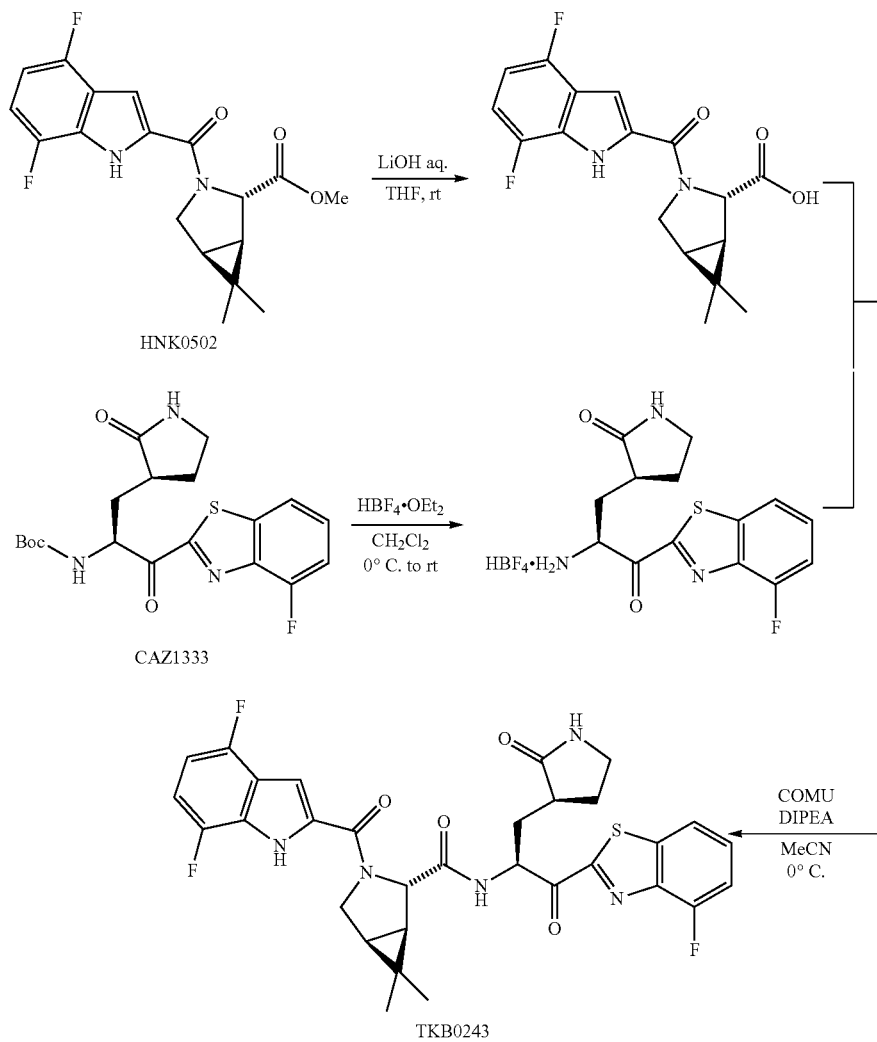

To a solution of methyl ester compound HNK0502 (174 mg, 0.500 mmol)/tetrahydrofuran (5.0 mL) was added an aqueous solution of 2M lithium hydroxide (0.500 mL, 1.00 mmol) at 0° C. After stirring at room temperature for 3 hours, the reaction liquid was made acidic by adding an aqueous solution of 1M hydrochloric acid to the reaction liquid. The mixed solution was concentrated under reduced pressure to obtain a crude compound of a carboxylic acid. The crude compound was used in the next reaction without further purification.

To a solution of Boc-protected amine compound CAZ1333 (203 mg, 0.500 mmol)/dichloromethane (5.0 mL) was added dropwise tetrafluoroboric acid-diethyl ether (0.240 mL, 1.75 mmol) at 0° C. in a nitrogen atmosphere, followed by stirring at room temperature for 3 hours. The reaction liquid was concentrated under reduced pressure, and the residue was washed with 2% methanol-containing diethyl ether. The crude compound of the tetrafluoroborate was used in the next reaction without further purification.

The crude compound of the tetrafluoroborate (0.500 mmol) was dissolved in acetonitrile (5.0 mL) at 0° C., and the crude compound of carboxylic acid (0.500 mmol), COMU (257 mg, 0.600 mmol), and DIPEA (0.170 mL, 1.00 mmol) was added, followed by stirring at 0° C. for 21 hours. To the reaction liquid was added saturated aqueous ammonium chloride to stop the reaction, followed by extracting with dichloromethane. Then, the organic phase was washed with saturated saline, then dried over anhydrous magnesium sulfate, and concentrated under reduced pressure. The residue was partially purified by an automated silica gel flash column chromatography using chloroform-methanol (100:0 to 94:6) as a developing solvent to obtain crude compound TKB0243. Further purification was conducted by preparative reversed-phase HPLC and semi-preparative HPLC (CHIRALPAK IC semi-preparative column) to obtain TKB0243 (39.8 mg, 13%, a mixture of rotamers) as a white to pale yellow powder.

Reversed-phase HPLC (linear gradient 40-70% (B/A+B)/30 min, elution time=22.7 min) for analysis;

$^1$H NMR (500 MHz, CDCl$_3$) δ 10.02 (s, 0.8H), 9.89 (S, 0.2H), 9.29-9.28 (m, 0.2H), 8.50-8.49 (m, 0.8H), 7.69-7.65 (m, 1H), 7.46-7.39 (m, 1H), 7.25-7.14 (m, 1H), 6.99 (s, 0.8H), 6.90 (s, 0.2H), 6.85-6.79 (m, 1H), 6.65-6.58 (m, 1H), 6.40 (m, 0.2H), 6.28 (m, 0.8H), 5.73-5.72 (m, 0.8H), 5.56-5.54 (m, 0.2H), 4.74-4.72 (m, 1H), 4.29-3.93 (m, 2H), 3.38-3.37 (m, 2H), 2.78-2.43 (m, 4H), 2.26-2.11 (m, 2H), 2.08-1.91 (m, 1H), 1.07 (s, 3H), 0.93 (m, 3H);

¹³C NMR {1H} (126 MHz, CDCl₃) δ 191.8, 191.7, 180.7, 180.5, 172.0, 171.7, 164.6, 164.6, 160.7, 160.2, 158.2, 156.1, 153.9, 152.0, 146.8, 144.9, 142.7, 142.5, 139.7, 139.6, 130.9, 130.9, 129.0, 128.9, 126.2-125.8 (m), 120.2 (dd, J=24.1 Hz and 4.8 Hz), 118.1, 112.4 (d, J=18.1 Hz), 109.0-108.7 (m), 104.3-104.0 (m), 102.9, 101.9, 62.4, 56.1, 55.4, 49.2, 48.7, 41.1, 41.0, 39.7, 39.3, 34.0, 33.3, 32.1, 30.4, 29.0, 28.5, 28.3, 26.3, 26.2, 25.0, 19.7, 19.6, 12.9, 12.8;

HRMS (ESI), m/z calcd for $C_{31}H_{28}F_3N_5O_4S$ $[M+H]^+$ 624.1887, found 624.1885.

(Synthesis Example 2) Synthesis of (1R,2S,5S)-3-(7-fluoro-4-methoxy-1H-indole-2-carbonyl)-N—((S)-1-(4-fluorobenzo[d]thiazol-2-yl)-1-oxo-3-((S)-2-oxopyrrolidin-3-yl)propan-2-yl)-6,6-dimethyl-3-azabicyclo[3.1.0]hexane-2-carboxamide (No: 244)

In order to synthesize a compound (TKB0244) indicated as No: 244 in Table 2 and represented by the following formula, Methyl (1R,2S,5S)-3-(7-fluoro-4-methoxy-1H-indole-2-carbonyl)-6,6-dimethyl-3-azabicyclo[3.1.0]hexane-2-carboxylate (HNK0437) was first synthesized in steps shown below.

[Chem. 26]

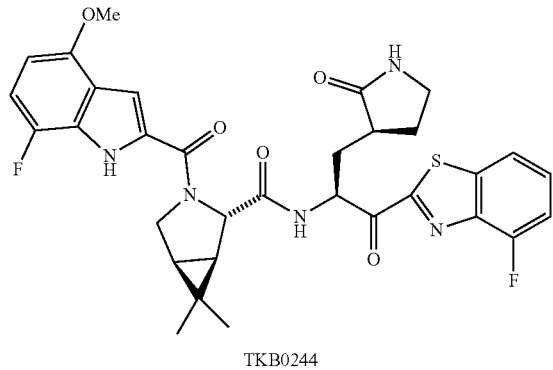

TKB0244

[Chem. 27]

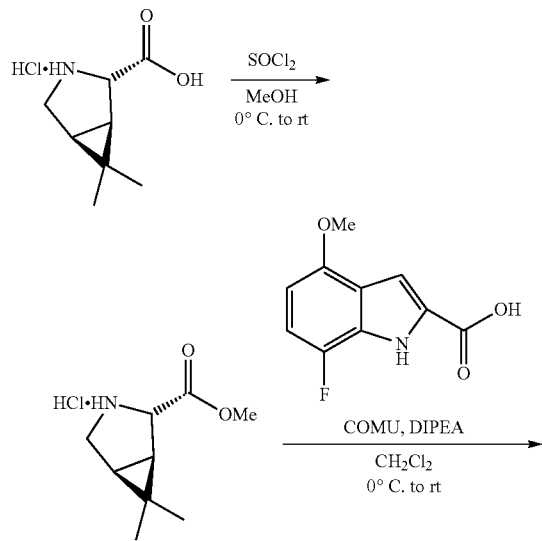

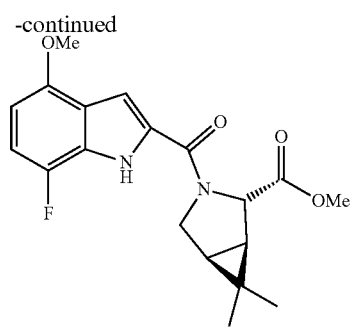

HNK0437

To a solution of (1R,2S,5S)-6,6-dimethyl-3-azabicyclo[3.1.0]hexane-2-carboxylic acid hydrochloride (191 mg, 1.00 mmol)/methanol (3.3 mL) was added dropwise thionyl chloride (0.290 mL, 4.00 mmol) at 0° C., followed by stirring at room temperature for 28 hours and then concentrating under reduced pressure to obtain a crude compound of a methyl ester. The obtained crude compound was used in the next reaction without further purification.

To a dichloromethane (10 mL) solution of the methyl ester were added 7-fluoro-4-methoxy-1H-indole-2-carboxylic acid (209 mg, 1.00 mmol), COMU (514 mg, 1.20 mmol), and DIPEA (0.510 mL, 3.00 mmol) at 0° C., followed by stirring at room temperature for 16 hours. To the reaction liquid was added saturated aqueous ammonium chloride to stop the reaction, followed by extracting with dichloromethane, washing the organic phase with saturated saline, then drying over anhydrous magnesium sulfate, and concentrating under reduced pressure. The residue was purified by silica gel flash column chromatography using hexane-ethyl acetate (3:1) as a developing solvent to obtain HNK0437 (307 mg, 85%, a mixture of rotamers) as a white solid.

¹H NMR (400 MHz, CDCl₃) δ 10.28 (s, 0.1H), 10.00 (s, 0.9H), 7.08-7.07 (m, 1H), 6.87-6.80 (m, 1H), 6.30-6.24 (m, 1H), 4.87 (s, 0.1H), 4.76 (s, 0.9H), 4.18 (dd, J=10.2 Hz and 5.4 Hz, 1H), 4.07-4.04 (m, 0.1H), 4.00-3.96 (m, 0.9H), 3.89 (s, 2.7H), 3.86 (s, 0.3H), 3.75 (s, 2.7H), 3.72 (s, 0.3H), 1.65 (d, J=7.5 Hz, 0.1H) 1.59 (dd, J=7.4 Hz and 5.4 Hz, 0.9H), 1.51-1.45 (m, 1H), 1.05 (s, 3H), 0.96 (s, 0.3H) 0.93 (s, 2.7H);

¹³C NMR (100 MHz, CDCl₃) δ 172.2, 172.0, 160.5, 160.1, 150.3 (d, J=2.2 Hz), 144.6 (d, J=238.7 Hz), 129.6, 129.5, 125.6 (d, J=16.1 Hz), 121.8 (d, J=4.9 Hz), 109.1 (d, J=17.7 Hz), 108.9 (d, J=18.3 Hz), 104.4, 104.4, 102.7, 98.4 (d, J=6.1 Hz), 60.9, 60.7, 55.6, 52.8, 52.5, 48.5, 48.2, 33.2, 29.9, 28.2, 26.3, 26.2, 24.9, 19.7, 19.6, 12.6, 12.6;

HRMS (ESI), m/z calcd for $C_{19}H_{22}FN_2O_4$ $[M+H]^+$ 361.1558, found 361.1556.

Meanwhile, tert-Butyl ((S)-1-(5-fluorobenzo[d]thiazol-2-yl)-1-oxo-3-((S)-2-oxopyrrolidin-3-yl)propan-2-yl)carbamate (CAZ1333) was synthesized by the above reactions described in Synthesis Example 1.

Next, from the compounds HNK0437 and CAZ1333 obtained as described above, TKB0244 was synthesized by the reactions shown below.

[Chem. 28]

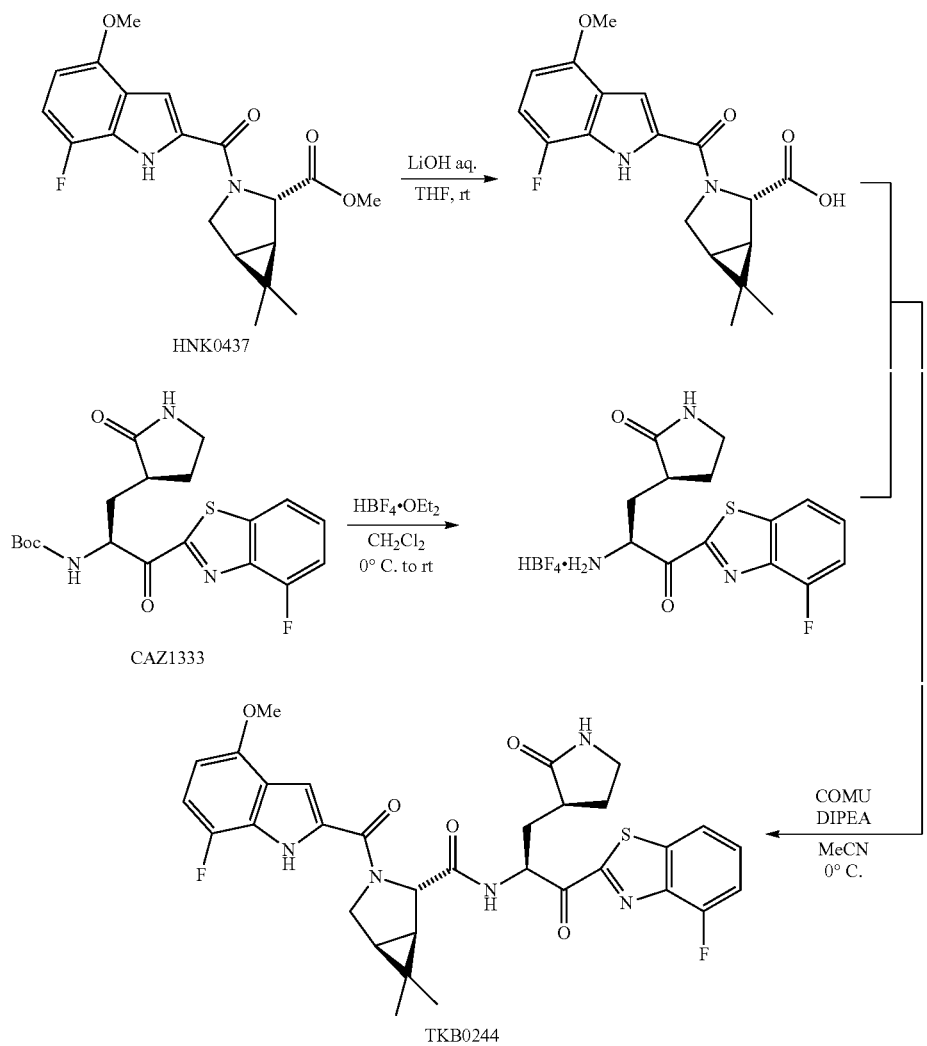

To a solution of methyl ester compound HNK0437 (307 mg, 0.851 mmol)/tetrahydrofuran (8.5 mL) was added an aqueous solution of 2M lithium hydroxide (0.851 mL, 1.70 mmol) at 0° C. After stirring at room temperature for 4.5 hours, the reaction liquid was made acidic by adding an aqueous solution of 1M hydrochloric acid to the reaction liquid. The mixed solution was concentrated under reduced pressure to obtain a crude compound of a carboxylic acid. The crude compound was used in the next reaction without further purification.

To a solution of Boc-protected amine compound CAZ1333 (346 mg, 0.851 mmol)/dichloromethane (8.5 mL) was added dropwise tetrafluoroboric acid-diethyl ether (0.411 mL, 2.97 mmol) at 0° C. in a nitrogen atmosphere, followed by stirring at room temperature for 4.5 hours. The reaction liquid was concentrated under reduced pressure, and the residue was washed with 2% methanol-containing diethyl ether. The crude compound of the tetrafluoroborate was used in the next reaction without further purification.

The crude compound of the tetrafluoroborate (0.851 mmol) was dissolved in acetonitrile (8.5 mL) at 0° C., and the crude compound of carboxylic acid (0.851 mmol), COMU (428 mg, 1.02 mmol), and DIPEA (0.289 mL, 1.70 mmol) were added, followed by stirring at 0° C. for 48 hours. To the reaction liquid was added saturated aqueous ammonium chloride to stop the reaction, followed by extracting with dichloromethane. Then, the organic phase was washed with saturated saline, then dried over anhydrous magnesium sulfate, and concentrated under reduced pressure. The residue was partially purified by an automated silica gel flash column chromatography using chloroform-methanol (100:0 to 94:6) as a developing solvent to obtain crude compound TKB0244. Further purification was conducted by preparative reversed-phase HPLC and semi-preparative HPLC (CHIRALPAK IC semi-preparative column) to obtain TKB0244 (23.4 mg, 4%, a mixture of rotamers) as a pale yellow solid.

Reversed-phase HPLC (linear gradient 40-70% (B/A+B)/30 min, elution time=18.6 min) for analysis;

$^1$H NMR (500 MHz, CDCl$_3$) δ 9.68 (s, 0.8H), 9.60 (s, 0.2H), 8.65 (d, J=6.3 Hz, 0.2H), 8.44 (d, J=6.3 Hz, 0.8H), 7.67 (d, J=7.4 Hz, 0.8H), 7.63 (d, J=8.0 Hz, 0.2H), 7.47-7.38 (m, 1H), 7.22-7.18 (m, 0.2H), 7.16-7.12 (m, 0.8H), 7.05-7.03 (m, 0.8H), 6.89-6.88 (m, 0.2H), 6.85 (dd, J=10.6 Hz and 8.3 Hz, 0.8H), 6.79 (dd, J=10.6 Hz and 8.3 Hz, 0.2H), 6.30 (dd, J=8.6 Hz and 2.9 Hz, 0.8H), 6.23 (dd, J=8.6 Hz and 2.9 Hz, 0.2H), 6.20 (brs, 0.2H), 6.05 (brs, 0.8H), 5.75-5.71 (m, 0.8H), 5.57-5.53 (m, 0.2H), 4.77 (s, 0.2H), 4.72 (s, 0.8H), 4.28-4.22 (m, 1H), 4.07-4.06 (m, 0.2H), 3.98 (d, J=10.3 Hz, 0.8H), 3.92 (s, 2.4H), 3.87 (s, 0.6H), 3.38-3.29 (m, 1.8H), 3.21-3.16 (m, 0.2H), 2.79-2.72 (m, 0.8H), 2.70-2.64 (m, 0.2H), 2.58-2.52 (m, 0.8H), 2.35-2.22 (m, 1.2H), 2.22-2.10 (m, 1H), 2.07-1.99 (m, 1H), 1.97-1.82 (m, 1H), 1.66-1.66 (m, 1H), 1.08 (s, 2.4H), 1.06 (s, 0.6H), 0.92-0.92 (m, 3H);

$^{13}$C NMR {1H}(126 MHz, CDCl$_3$) δ 191.9, 191.8, 180.1, 172.2, 171.8, 164.7, 164.4, 161.0, 160.5, 157.1 (d, J=262.0 Hz), 150.5, 150.4, 144.6 (d, J=239.1 Hz), 144.5 (d, J=239.1 Hz), 142.6 (d, J=13.2 Hz), 142.6 (d, J=14.5 Hz), 139.6, 129.6, 129.4, 129.0-128.8 (m), 125.5-125.3 (m), 121.9 (d, J=4.8 Hz), 118.1-118.0 (m), 112.4 (d, J=16.8 Hz), 109.1 (d, J=18.0 Hz), 109.0 (d, J=18.0 Hz), 104.5, 103.6, 98.6 (d, J=6.0 Hz), 98.4 (d, J=6.0 Hz), 62.5, 62.3, 55.8, 55.8, 55.7, 55.4, 49.2, 48.5, 40.8, 40.7, 39.0, 38.9, 34.0, 33.3, 32.9, 30.4, 28.6, 28.4, 26.4, 26.3, 24.9, 19.7, 19.5, 12.9, 12.8;

HRMS (ESI), m/z calcd for C$_{32}$H$_{31}$F$_2$N$_5$O$_5$S [M+H]$^+$ 636.2087, found 636.2088.

(Synthesis Example 3) Synthesis of (1R,2S,5S)-3-((S)-3,3-dimethyl-2-(2,2,2-trifluoroacetamido)butanoyl)-N—((S)-1-(4-fluorobenzo[d]thiazol-2-yl)-1-oxo-3-((S)-2-oxopyrrolidin-3-yl)propan-2-yl)-6,6-dimethyl-3-azabicyclo[3.1.0]hexane-2-carboxamide (No: 245)

In order to synthesize a compound (TKB0245) indicated as No: 245 in Table 1 and represented by the following formula, (1R,2S,5S)-3-((S)-3,3-dimethyl-2-(2,2,2-trifluoroacetamido)butanoyl)-6,6-dimethyl-3-azabicyclo[3.1.0] hexane-2-carboxylic acid (TIS1038) was first synthesized in steps shown below.

[Chem. 29]

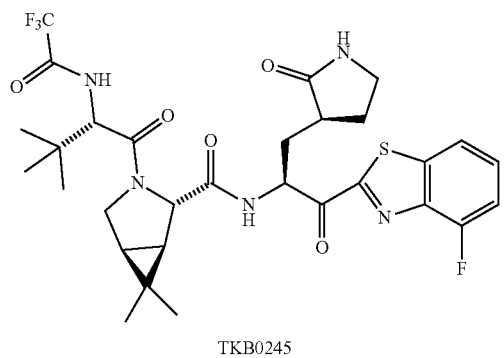

TKB0245

[Chem. 30]

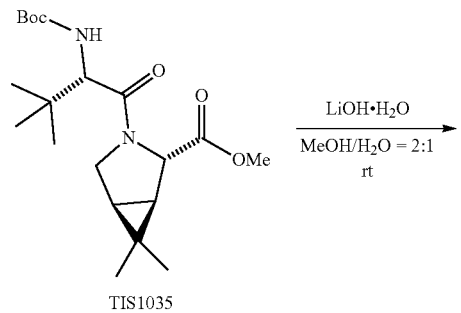

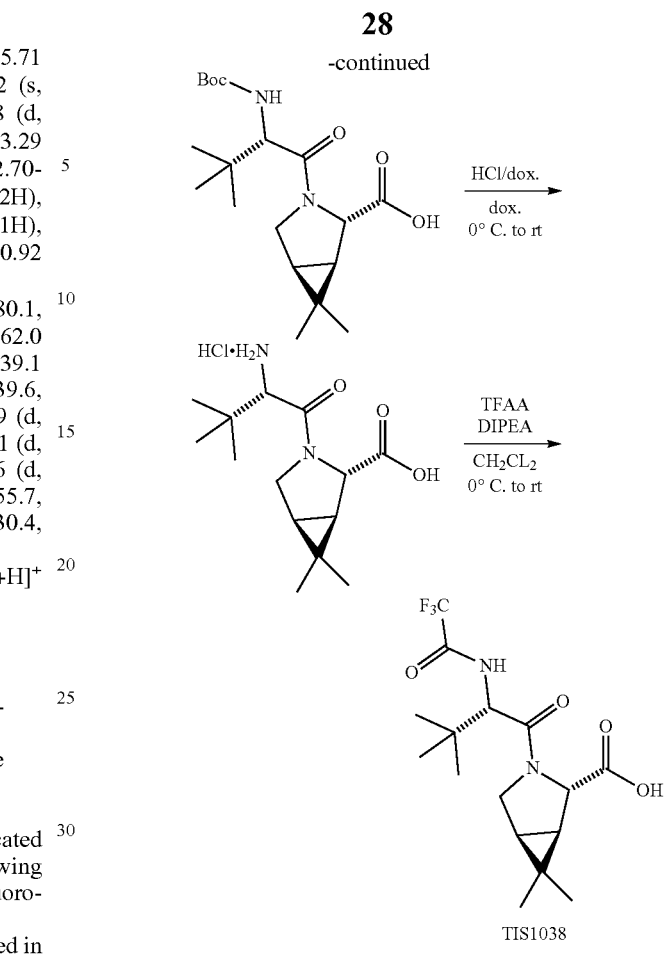

Methyl (1R,2S,5S)-3-((S)-2-((tert-butoxycarbonyl) amino)-3,3-dimethylbutanoyl)-6,6-dimethyl-3-azabicyclo [3.1.0]hexane-2-carboxylate (TIS1035) was synthesized in accordance with the method described in Latha G. Nair et al., "P4 capped amides and lactams as HCV NS3 protease inhibitors with improved potency and DMPK profile", Bioorg Med Chem Lett., 2010, 20, 567-570. Subsequently, to a solution of TIS1035 (705 mg, 1.84 mmol)/methanol (12 mL)/H$_2$O (6.0 mL) was added lithium hydroxide-hydrate (116 mg, 2.76 mmol) at room temperature. After stirring at room temperature for 3 hours, lithium hydroxide-hydrate (38.6 mg, 0.921 mmol) was further added, followed by stirring at room temperature for 1.5 hours. Thereafter, the reaction liquid was cooled to 0° C., and made acidic by adding an aqueous solution of 2M hydrochloric acid to the reaction liquid. To the obtained reaction liquid was added saturated saline, followed by extracting with ethyl acetate. The organic phase was dried over anhydrous magnesium sulfate, followed by concentrating under reduced pressure to obtain a crude compound of a carboxylic acid. The obtained crude compound was used in the next reaction without further purification.

The carboxylic acid (1.84 mmol) was treated with a 4M hydrochloric acid/dioxane solution (9.2 mL) at 0° C., followed by stirring at room temperature for 4 hours. The reaction liquid was concentrated under reduced pressure to obtain a crude compound of a hydrochloride of the amine compound, which was used in the next reaction without further purification.

To a solution of the hydrochloride of the amine compound (1.84 mmol)/dichloromethane (18 mL) were added DIPEA (0.936 mL, 5.52 mmol) and trifluoroacetic anhydride (TFAA) (0.764 mL, 5.52 mmol) at 0° C., followed by stirring at room temperature for 10 hours. Thereafter, H₂O was added, followed by extracting with dichloromethane. The organic phase was dried over anhydrous magnesium sulfate, followed by concentrating under reduced pressure to obtain a crude compound of carboxylic acid TIS1038. The obtained crude compound was purified by silica gel flash column chromatography using chloroform-methanol (100:0 to 10:1) as a developing solvent to obtain TIS1038 (245 mg, three steps 35%, a mixture of rotamers) as a yellow solid.

¹H NMR (500 MHz, CDCl₃) δ 7.49 (d, J=9.7 Hz, 0.9H), 7.42 (d, J=9.7 Hz, 0.1H), 6.43 (s, 1H), 4.61 (d, J=9.7 Hz, 0.9H), 4.46-4.44 (m, 1H), 4.34 (d, J=9.2 Hz, 0.1H), 3.93 (dd, J=10.3 Hz and 5.2 Hz, 0.9H), 3.86 (d, J=10.3 Hz, 0.9H), 3.77 (dd, J=12.9 and 5.4 Hz, 0.1H), 3.55 (d, J=12.6 Hz, 0.1H), 1.68 (d, J=7.4 Hz, 0.1H), 1.61 (d, J=7.4 Hz, 0.9H), 1.54-1.47 (m, 1H), 1.08-0.98 (m, 12.3H), 0.89 (s, 2.7H);

¹³C NMR (126 MHz, CDCl₃) δ 175.3, 175.0, 169.6, 169.4, 157.4 (q, J=37.6 Hz), 115.9 (q, J=288.5 Hz), 61.1, 59.8, 58.4, 58.0, 48.3, 47.6, 36.9, 36.1, 32.8, 30.2, 27.4, 26.4, 26.4, 26.3, 26.2, 25.7, 20.2, 19.7, 13.3, 12.5;

HRMS (ESI), m/z calcd for $C_{18}H_{19}F_2N_2O_3$ [M+H]⁺ 363.1537, found 363.1534.

Meanwhile, tert-Butyl ((S)-1-(5-fluorobenzo[d]thiazol-2-yl)-1-oxo-3-((S)-2-oxopyrrolidin-3-yl)propan-2-yl)carbamate (CAZ1333) was synthesized by the above reactions described in Synthesis Example 1.

Next, from the compounds TIS1038 and CAZ1333 obtained as described above, TKB0245 was synthesized by the reactions shown below.

[Chem. 31]

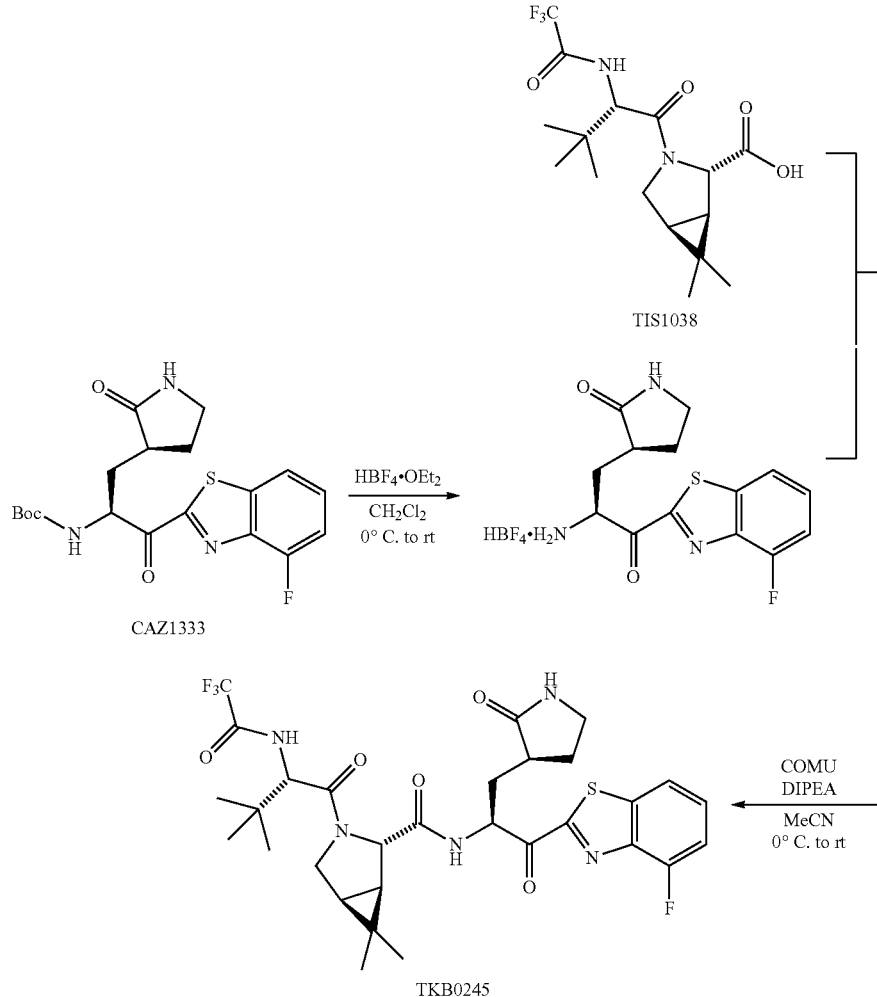

To a solution of Boc-protected amine compound CAZ1333 (143 mg, 0.350 mmol)/dichloromethane (3.5 mL) was added dropwise tetrafluoroboric acid-diethyl ether (0.0961 mL, 0.700 mmol) at 0° C. in a nitrogen atmosphere, followed by stirring at room temperature for 1 hour. The reaction liquid was concentrated under reduced pressure, and the residue was washed with 2% methanol-containing diethyl ether. The crude compound of the tetrafluoroborate was used in the next reaction without further purification.

The crude compound of the tetrafluoroborate (0.180 mmol) was dissolved in acetonitrile (1.5 mL) at 0° C., and the crude compound of carboxylic acid TIS1038 (0.150 mmol), COMU (77.1 mg, 0.180 mmol), and DIPEA (0.0765 mL, 0.450 mmol) were added, followed by stirring at room temperature for 15 hours. To the reaction liquid was added saturated aqueous ammonium chloride to stop the reaction, followed by extracting with dichloromethane, then drying over anhydrous magnesium sulfate, and concentrating under reduced pressure. The residue was partially purified by automated silica gel flash column chromatography using chloroform-methanol (100:0 to 94:6) as a developing solvent to obtain crude compound TKB0245. Further purification was conducted by preparative reversed-phase HPLC and semi-preparative HPLC (CHIRALPAK IC semi-preparative column) to obtain TKB0245 (2.8 mg, 5%, a mixture of rotamers) as a white solid.

Reversed-phase HPLC (linear gradient 40-70% (B/A+B)/30 min, elution time=23.2 min) for analysis;

$^1$H NMR (400 MHz, CDCl$_3$) δ 8.91 (d, J=5.0 Hz, 0.2H), 7.89 (d, J=7.3 Hz, 0.8H), 7.76-7.71 (m, 1H), 7.54-7.46 (m, 1H), 7.28-7.22 (m, 1H), 7.09 (d, J=9.2 Hz, 0.8H), 7.00 (d, J=9.2 Hz, 0.2H), 6.55 (s, 0.8H), 6.32 (s, 0.2H), 5.88-5.82 (m, 0.8H), 5.64-5.59 (m, 0.2H), 4.57 (d, J=9.4 Hz, 0.8H), 4.40 (s, 1H), 4.29 (d, J=9.2 Hz, 0.2H), 3.98 (dd, J=10.2 Hz and 5.3 Hz, 1H), 3.83-3.78 (m, 1H), 3.52-3.35 (m, 2H), 3.29-3.21 (m, 0.2H), 2.82-2.65 (m, 1H), 2.64-2.55 (m, 0.8H), 2.38-2.24 (m, 1H), 2.19-2.00 (m, 2H), 1.67 (d, J=7.7 Hz, 0.2H), 1.60-1.58 (m, 0.8H), 1.55-1.52 (m, 0.8H), 1.47 (dd, J=7.6 Hz and 5.5 Hz, 0.2H), 1.07-1.03 (m, 11H), 0.95 (s, 1.5H), 0.88 (s, 2.5H);

$^{13}$C NMR {1H} (101 MHz, CDCl$_3$) δ 192.2, 192.0, 181.9, 180.8, 171.2, 171.0, 169.2, 168.8, 164.4, 164.2, 157.4 (d, J=261.1 Hz), 157.3 (d, J=260.3 Hz), 157.1 (q, J=37.4 Hz), 156.8-156.5 (m), 142.9 (d, J=13.9 Hz), 142.8 (d, J=14.0 Hz), 139.8 (d, J=2.4 Hz), 129.2 (d, J=7.3 Hz), 129.0 (d, J=7.1 Hz), 118.3 (d, J=4.5 Hz), 118.1 (d, J=4.5 Hz), 116.0 (q, J=288.0 Hz), 115.9 (q, J=287.7 Hz), 112.7 (d, J=17.5 Hz), 112.5 (d, J=17.4 Hz), 62.0, 61.3, 58.3, 58.0, 56.0, 54.7, 48.7, 48.0, 41.3, 41.0, 39.7, 39.1, 37.2, 36.2, 33.8, 33.8, 32.5, 30.7, 29.3, 28.2, 27.9, 26.6, 26.5, 26.4, 26.2, 20.2, 19.5, 13.5, 12.7;

HRMS (ESI), m/z calcd for $C_{32}H_{31}F_2N_5O_5S$ [M+H]$^+$ 654.2368, found 654.2365.

(Synthesis Example 4) Synthesis of 2,2,2-trifluoro-N—((S)-1-((1R,2S,5S)-2-(((S)-1-(4-fluorobenzo[d]thiazol-2-yl)-1-oxo-3-((S)-2-oxopyrrolidin-3-yl)propan-2-yl)carbamothioyl)-6,6-dimethyl-3-azabicyclo[3.1.0]hexan-3-yl)-3,3-dimethyl-1-oxobutan-2-yl)acetamide (No: 245S)

In order to synthesize a compound (compound 245S, TKB0245S) indicated as No: 245S in Table 1 and represented by the following formula, tert-butyl (1R,2S,5S)-2-((2-amino-5-nitrophenyl)carbamoyl)-6,6-dimethyl-3-azabicyclo[3.1.0]hexane-3-carboxylate (TIS1110) was first synthesized in steps shown below.

[Chem. 32]

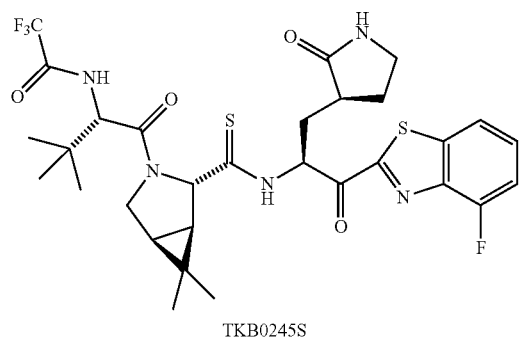

TKB0245S

[Chem. 33]

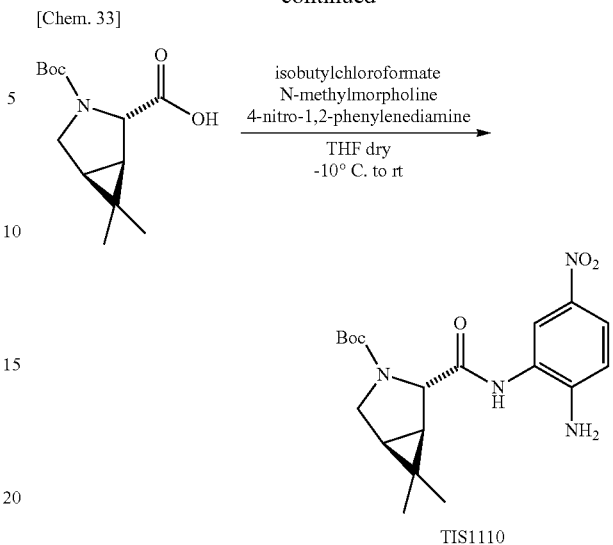

TIS1110

To an anhydrous tetrahydrofuran (25 mL) solution of (1R,2S,5S)-3-(tert-butoxycarbonyl)-6,6-dimethyl-3-azabicyclo[3.1.0]hexane-2-carboxylic acid (638 mg, 2.50 mmol) were added N-methylmorphorine (0.550 mL, 5.00 mmol) and isobutyl chloroformate (0.361 mL, 2.75 mmol) at −10° C. in an argon atmosphere. The reaction liquid was stirred for 10 minutes, and 4-nitro-1,2-phenylenediamine (422 mg, 2.76 mmol) was added at the same temperature, followed by stirring at −10° C. for 2 hours, and further stirring at room temperature for 16.5 hours. Saturated aqueous ammonium chloride was added, followed by extracting with ethyl acetate, and the organic phase was dried over anhydrous magnesium sulfate and concentrated under reduced pressure. The residue was purified by automated silica gel flash column chromatography (Isolera One) using hexane-ethyl acetate (23:2 to 3:2) as a developing solvent to obtain TIS1110 (881 mg, 2.26 mmol, 90%, a mixture of rotamers) as a yellow solid.

$^1$H NMR (500 MHz, MeOD) δ 8.19 (d, J=2.3 Hz, 0.4H), 8.03 (d, J=2.3 Hz, 0.6H), 7.95 (dt, J=9.2 Hz and 2.9 Hz, 1H), 7.92-7.85 (m, 1H), 6.84 (d, J=8.6 Hz, 0.4H), 6.80-6.74 (m, 0.7H), 4.24 (s, 0.4H), 4.20 (s, 0.6H), 3.75 (dd, J=11.2 Hz and 4.6 Hz, 1H), 3.44 (t, J=10.9 Hz, 1H), 1.66-1.51 (m, 2H), 1.47 (s, 5.6H), 1.47 (s, 3.7H), 1.11 (s, 3H), 1.04 (s, 1.0H), 1.03 (s, 1.7H);

$^{13}$C NMR (126 MHz, CDCl$_3$) δ 170.5, 155.6, 147.4, 138.7.123.8, 122.7, 121.4, 114.7, 81.6, 61.4, 47.3, 30.3, 28.6(3C), 27.7, 26.3, 19.1, 12.7; HRMS (ESI), m/z calcd for $C_{19}H_{27}N_4O_5$ [M+H]$^+$ 391.1976, found 391.1972.

Next, from the obtained TIS1110, tert-butyl (1R,2S,5S)-2-((2-amino-5-nitrophenyl)carbamothioyl)-6,6-dimethyl-3-azabicyclo[3.1.0]hexane-3-carboxylate (TIS1111) was synthesized in steps shown below.

[Chem. 34]

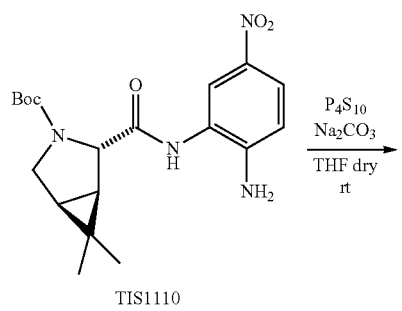

TIS1110

[Chem. 35]

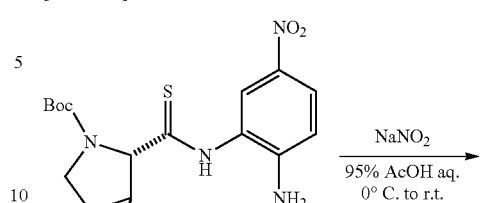

TIS1111

TIS1111

To a solution of anhydrous sodium carbonate (160 mg, 1.51 mmol)/anhydrous tetrahydrofuran (15 mL) was added phosphorus pentasulfide (335 mg, 1.51 mmol) at room temperature in an argon atmosphere. The mixture was stirred for 2.5 hours until the mixture became a pale yellow transparent solution. Thereafter, to the reaction mixture was added TIS1110 (586 mg, 1.50 mmol), followed by stirring for 25 hours. After the reaction ended, the solvent was distilled under reduced pressure, and the residue was purified by silica gel column chromatography using chloroform as a developing solvent to obtain TIS1111 (533 mg, 1.31 mmol, 87%, a mixture of rotamers) as a yellow solid.

$^1$H NMR (500 MHz, MeOD) δ 8.05-7.94 (m, 2H), 7.92-7.85 (m, 1H), 6.86 (d, J=8.6 Hz, 0.3H), 6.78 (d, J=9.2 Hz, 0.7H), 4.59 (s, 0.3H), 4.56 (s, 0.7H), 3.86 (dd, J=10.9 Hz and 5.2 Hz, 1H), 3.49 (d, J=10.9 Hz, 0.3H), 3.44 (d, J=10.9 Hz, 0.7H), 1.66-1.49 (m, 2H), 1.46 (s, 2.5H), 1.45 (s, 6.6H), 1.11 (s, 3H), 1.06 (s, 1.7H), 1.05 (s, 0.9H);

$^{13}$C NMR (126 MHz, CDCl$_3$) δ 205.6, 155.2, 148.9, 138.2, 125.8, 125.4, 122.0, 114.8, 81.7, 68.7, 47.7, 34.4, 28.7(3C), 27.9, 26.3, 20.0, 13.1;

HRMS (ESI), m/z calcd for $C_{19}H_{27}N_4O_4S$ [M+H]$^+$ 407.1748, found 407.1748.

Next, from the obtained TIS1111, tert-butyl (1R,2S,5S)-6,6-dimethyl-2-(6-nitro-1H-benzo[d][1,2,3]triazole-1-carbonothioyl)-3-azabicyclo[3.1.0]hexane-3-carboxylate (TIS1123) was synthesized in steps shown below.

TIS1111 (276 mg, 0.679 mmol) was dissolved in an aqueous solution of 95% acetic acid (7.0 mL) at 40° C., and cooled to 0° C. Then, sodium nitrite (69.9 mg, 1.01 mmol) was added little by little while stirring the mixture, and the mixture was stirred at room temperature for 30 minutes. Thereafter, ice and water (up to 40 mL) were added, and the precipitated deposit was filtered, and washed with ice water. The residue was vacuum-dried overnight at room temperature to obtain TIS1123 as an orange solid, which was used in the reaction described below without further purification to synthesize tert-butyl (1R,2S,5S)-2-(((S)-1-(4-fluorobenzo[d]thiazol-2-yl)-1-oxo-3-((S)-2-oxopyrrolidin-3-yl)propan-2-yl)carbamothioyl)-6,6-dimethyl-3-azabicyclo[3.1.0]hexane-3-carboxylate (TIS1123).

[Chem. 36]

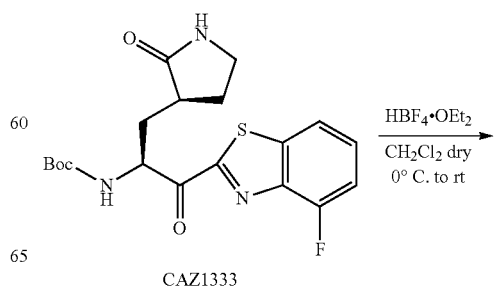

CAZ1333

-continued

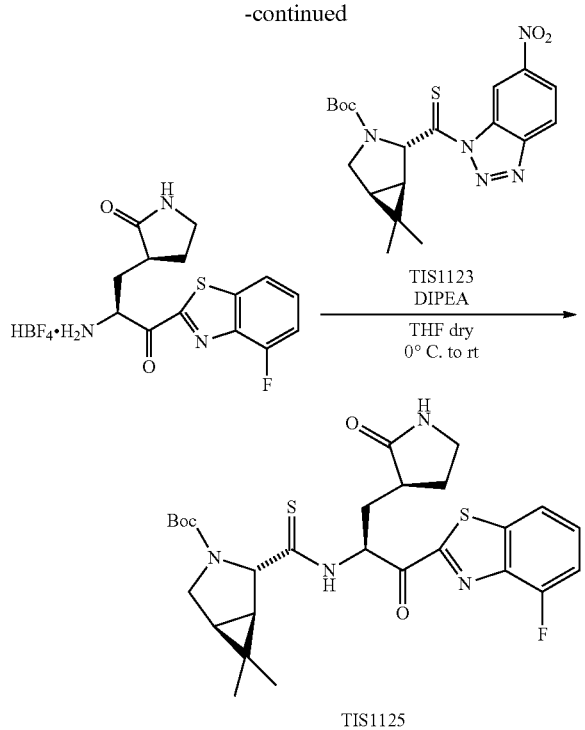

TIS1125

To a solution of CAZ1333 (206 mg, 0.506 mmol) synthesized by the above reactions described in Synthesis Example 1/dichloromethane (5.0 mL) was added dropwise tetrafluoroboric acid-diethyl ether (0.240 mL, 1.75 mmol) at 0° C. in an argon atmosphere, followed by stirring at room temperature for 30 minutes. Thereafter, the reaction liquid was concentrated under reduced pressure, and the residue was washed with 2% methanol-containing diethyl ether. The crude compound of tetrafluoroborate was used in the next reaction without further purification.

To a solution of the crude compound of tetrafluoroborate (0.506 mmol)/anhydrous tetrahydrofuran (5.0 mL) was added N,N-diisopropylethylamine (DIPEA) (0.0850 mL, 0.500 mmol) at room temperature in an argon atmosphere. To the solution were added a solution of TIS1123 (178 mg, 0.426 mmol)/anhydrous tetrahydrofuran (5.0 mL) and DIPEA (0.255 mL, 1.50 mmol) at 0° C., followed by stirring at room temperature for 6 hours. After the reaction ended, the solvent was distilled under reduced pressure, and the residue was partially purified by automated silica gel flash column chromatography using chloroform-methanol (100:0 to 19:1) as a developing solvent to obtain crude compound TIS1125.

Next, as shown below, to a solution of TIS1125 (0.426 mmol)/dichloromethane (4.0 mL) was added dropwise tetrafluoroboric acid-diethyl ether (0.210 mL, 1.53 mmol) at 0° C. in an argon atmosphere, followed by stirring at room temperature for 30 minutes. The reaction liquid was concentrated under reduced pressure, and the crude compound was washed with 2% (v/v) methanol-containing diethyl ether. The crude compound of tetrafluoroborate obtained in this way was used in the next reaction without further purification.

[Chem. 37]

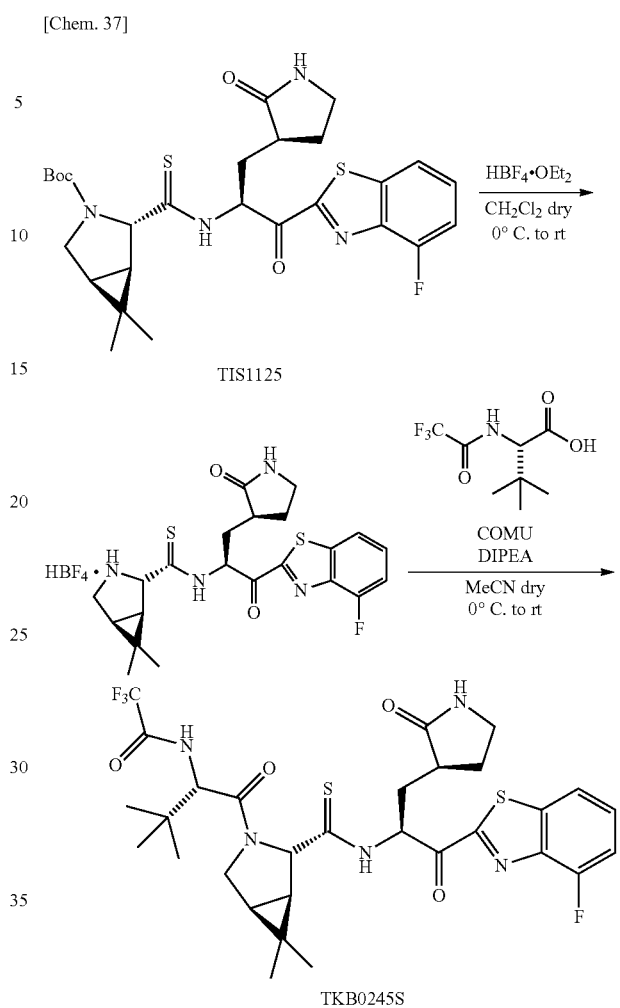

TKB0245S

To a solution of the crude compound of tetrafluoroborate (0.426 mmol)/anhydrous acetonitrile (2.0 mL) were added a solution of (S)-3,3-dimethyl-2-(2,2,2-trifluoroacetamide) butanoic acid (109 mg, 0.480 mmol)/anhydrous acetonitrile (2.0 mL), COMU (206 mg, 0.481 mmol), and DIPEA (0.289 mL, 1.70 mmol) at 0° C. in an argon atmosphere. Reaction was allowed at room temperature for 22 hours, and the reaction was stopped with saturated aqueous sodium bicarbonate, followed by extracting with dichloromethane. The organic phase was dried over anhydrous magnesium sulfate, and concentrated under reduced pressure. The residue was purified by automated silica gel flash column chromatography using chloroform-methanol (100:0 to 19:1) as a developing solvent to obtain TKB0245S as a crude compound. Further purification by semi-preparative HPLC (CHIRAL-PAK IC semi-preparative column, Daicel Corporation) using an eluting solvent of hexane-isopropanol (1:1 to 1:9/30 minutes) was conducted to obtain TKB0245S (3.0 mg, 0.0044 mmol, 1%, a mixture of rotamers) as a pale yellow solid.

Reversed-phase HPLC (linear gradient 50-70% (B/A+B)/30 min, elution time=20.2 min) for analysis;

$^1$H NMR (500 MHz, DMSO-d6) δ 7.75 (d, J=8.0 Hz, 1H), 7.52-7.48 (m, 1H), 7.27-7.24 (m, 1H), 7.07-7.02 (m, 1H), 6.20 (brs, 0.3H), 6.16 (t, J=4.9 Hz, 0.7H), 5.94 (s, 0.3H), 5.80 (s, 0.7H), 4.92 (s, 0.3H), 4.83 (s, 0.7H), 4.58 (d, J=9.7

Hz, 0.7H), 4.42 (d, J=9.7 Hz, 0.3H), 4.18 (dd, J=10.3 Hz and 5.2 Hz, 0.7H), 4.07 (dd, J=12.9 Hz and 6.0 Hz, 0.7H), 3.80-3.70 (m, 1H), 3.38-3.30 (m, 2H), 2.78-2.72 (m, 0.7H), 2.62-2.55 (m, 0.3H), 2.48-2.43 (m, 2H), 2.32-2.25 (m, 1H), 2.23-2.16 (m, 0.3H), 1.96-1.87 (m, 0.7H), 1.84-1.74 (m, 0.3H), 1.58-1.53 (m, 1H), 1.51-1.48 (m, 0.3H), 1.38-1.30 (m, 1H), 1.04-1.03 (m, 9H), 1.00 (s, 4.1H), 0.87 (s, 1.9H);

$^{13}$C NMR (125 MHz, DMSO-d6) δ;

HRMS (ESI), m/z calcd for $C_{30}H_{36}F_4N_5O_4S_2$ [M+H]$^+$ 670.2139, found 670.2141.

(Synthesis Example 5) Synthesis of (1R,2S,5S)-3-((S)-3,3-dimethyl-2-(2,2,2-trifluoroacetamido)butanoyl)-N—((S)-1-(5-fluorobenzo[d]thiazol-2-yl)-1-oxo-3-((S)-2-oxopyrrolidin-3-yl)propan-2-yl)-6,6-dimethyl-3-azabicyclo[3.1.0]hexane-2-carboxamide (No: 272)

In order to synthesize a compound (TKB0272) indicated as No: 272 in Table 1 and represented by the following formula, (1R,2S,5S)-3-((S)-3,3-dimethyl-2-(2,2,2-trifluoroacetamido)butanoyl)-6,6-dimethyl-3-azabicyclo[3.1.0]hexane-2-carboxylic acid (TIS1038) was first synthesized in steps shown below.

[Chem. 38]

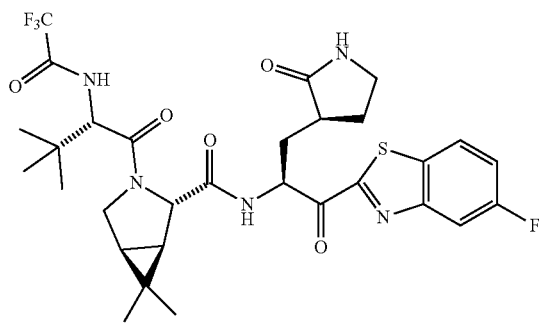

TKB0272

[Chem. 39]

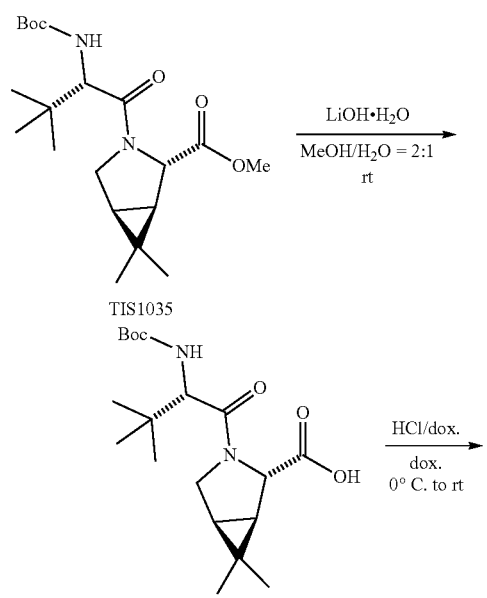

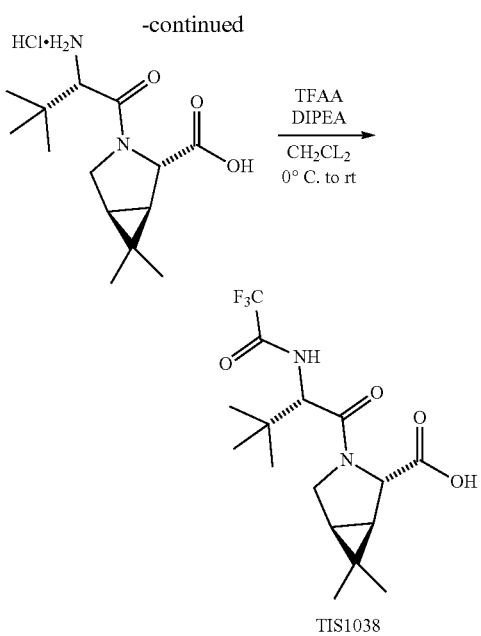

TIS1038

To a solution of methyl (1R,2S,5S)-3-((S)-2-((tert-butoxycarbonyl)amino)-3,3-dimethylbutanoyl)-6,6-dimethyl-3-azabicyclo[3.1.0]hexane-2-carboxylate (705 mg, 1.84 mmol) synthesized as described above/methanol (12 mL)/H$_2$O (6.0 mL) was added lithium hydroxide-hydrate (116 mg, 2.76 mmol) at room temperature. After stirring at room temperature for 3 hours, lithium hydroxide-hydrate (38.6 mg, 0.921 mmol) was further added, followed by stirring at room temperature for 1.5 hours. Thereafter, the reaction liquid was cooled to 0° C., and made acidic by adding an aqueous solution of 2M hydrochloric acid to the reaction liquid. To the obtained reaction liquid was added saturated saline, followed by extracting with ethyl acetate. The organic phase was dried over anhydrous magnesium sulfate, and then concentrated under reduced pressure to obtain a crude compound of carboxylic acid. The obtained crude compound was used in the next reaction without further purification.

The carboxylic acid (1.84 mmol) was treated with 4M hydrochloric acid/dioxane solution (9.2 mL) at 0° C., followed by stirring at room temperature for 4 hours. The reaction liquid was concentrated under reduced pressure to obtain a crude compound of a hydrochloride of the amine compound, which was used in the next reaction without further purification.

To a solution of the hydrochloride of the amine compound (1.84 mmol)/dichloromethane (18 mL) were added DIPEA (0.936 mL, 5.52 mmol) and trifluoroacetic anhydride (TFAA) (0.764 mL, 5.52 mmol) at 0° C., followed by stirring at room temperature for 10 hours. Thereafter, H$_2$O was added, followed by extracting with dichloromethane. The organic phase was dried over anhydrous magnesium sulfate, and then concentrated under reduced pressure to obtain a crude compound of carboxylic acid TIS1038. The obtained crude compound was purified by silica gel flash column chromatography using chloroform-methanol (100:0 to 10:1) as a developing solvent to obtain TIS1038 (245 mg, three steps 35%, a mixture of rotamers) as a yellow solid.

$^1$H NMR (500 MHz, CDCl$_3$) δ; 7.49 (d, J=9.7 Hz, 0.9H), 7.42 (d, J=9.7 Hz, 0.1H), 6.43 (s, 1H), 4.61 (d, J=9.7 Hz, 0.9H), 4.46-4.44 (m, 1H), 4.34 (d, J=9.2 Hz, 0.1H), 3.93 (dd,

J=10.3 Hz and 5.2 Hz, 0.9H), 3.86 (d, J=10.3 Hz, 0.9H), 3.77 (dd, J=12.9 and 5.4 Hz, 0.1H), 3.55 (d, J=12.6 Hz, 0.1H), 1.68 (d, J=7.4 Hz, 0.1H), 1.61 (d, J=7.4 Hz, 0.9H), 1.54-1.47 (m, 1H), 1.08-0.98 (m, 12.3H), 0.89 (s, 2.7H);

$^{13}$C NMR (126 MHz, CDCl$_3$) δ; 175.3, 175.0, 169.6, 169.4, 157.4 (q, J=37.6 Hz), 115.9 (q, J=288.5 Hz), 61.1, 59.8, 58.4, 58.0, 48.3, 47.6, 36.9, 36.1, 32.8, 30.2, 27.4, 26.4, 26.4, 26.3, 26.2, 25.7, 20.2, 19.7, 13.3, 12.5;

HRMS (ESI), m/z calcd for C16H22F3N2O4 [M−H]$^−$ 363.1537, found 363.1534.

Meanwhile, tert-Butyl ((S)-1-(5-fluorobenzo[d]thiazol-2-yl)-1-oxo-3-((S)-2-oxopyrrolidin-3-yl)propan-2-yl)carbamate (CAZ1235) was synthesized in steps shown below.

[Chem. 40]

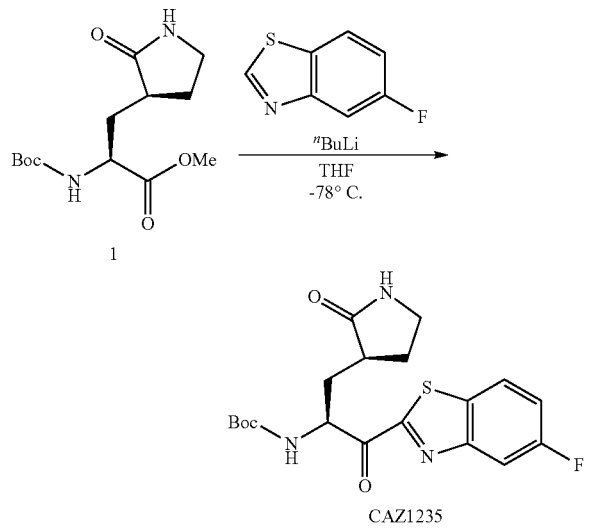

To a solution of 5-fluorobenzothiazole (322 mg, 2.10 mmol)/tetrahydrofuran (3.2 mL) was added dropwise n-butyllithium (1.60M hexane solution, 1.18 mL, 1.9 mmol) at −78° C. over 15 minutes. After stirring for 1 hour, a solution of methyl ester compound 1 (121 mg, 0.421 mmol)/tetrahydrofuran (1.0 mL) was added dropwise at −78° C. over 20 minutes, and continued stirring at −78° C. for 3 hours. To the reaction liquid was added saturated aqueous ammonium chloride to stop the reaction, followed by stirring at 0° C. for 20 minutes. The mixture liquid was concentrated under reduced pressure, and extracted with ethyl acetate. The organic phase was washed with saturated saline, then dried over anhydrous magnesium sulfate, and concentrated under reduced pressure. The residue was purified by silica gel flash column chromatography using a developing solvent of chloroform/methanol (40:1) to obtain CAZ1235 (CAZ1417) (129 mg, 75%) as a red-brown solid.

$^1$H NMR (500 MHz, CDCl$_3$) δ 7.93 (dd, J=8.9 Hz and 5.0 Hz, 1H), 7.84 (dd, J=9.0 Hz and 2.4 Hz, 1H), 7.33 (ddd, J=8.8 Hz, 8.8 Hz, and 2.5 Hz, 1H), 5.84-5.56 (m, 3H), 3.42-3.40 (m, 2H), 2.70-2.58 (m, 2H), 2.15-2.06 (m, 3H), 1.44 (s, 9H);

$^{13}$C NMR (125 MHz, CDCl$_3$) δ 193.2, 179.6, 166.3, 162.3 (d, J=245.8 Hz), 155.9, 154.4 (d, J=12.0 Hz), 133.0, 123.5 (d, J=9.8 Hz), 117.4 (d, J=25.4 Hz), 111.3 (d, J=23.4 Hz), 80.2, 55.5, 40.5, 38.5, 34.5, 28.4 (3C), 28.2;

HRMS (ESI), m/z calcd for C19H22FN3NaO4S [M+Na]$^+$ 430.1207, found 430.1212.

Next, from the compounds TIS1038 and CAZ1235 obtained as described above, TKB0272 was synthesized by the reaction shown below.

[Chem. 41]

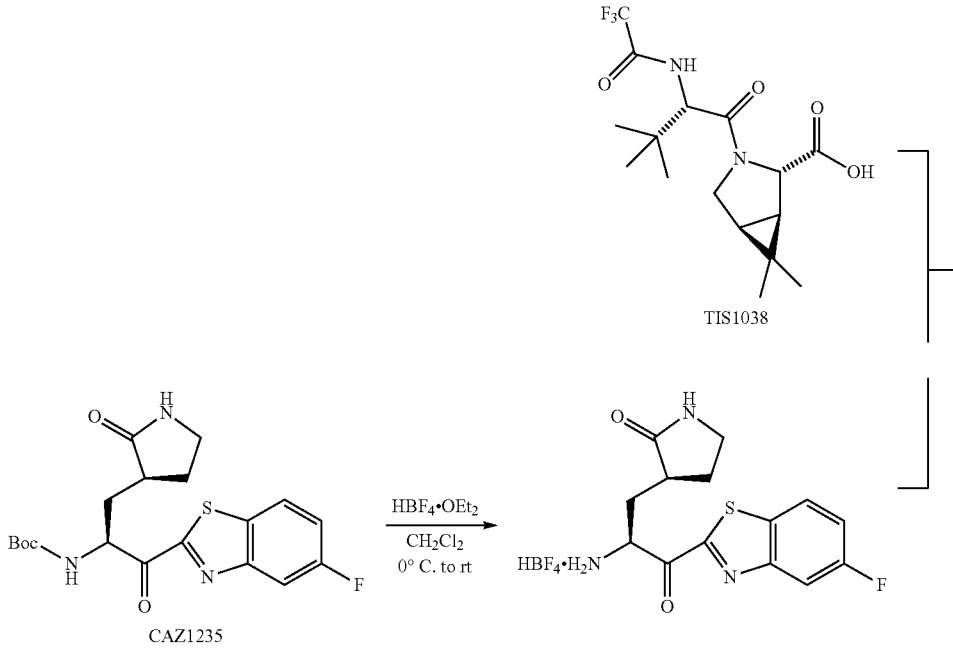

-continued

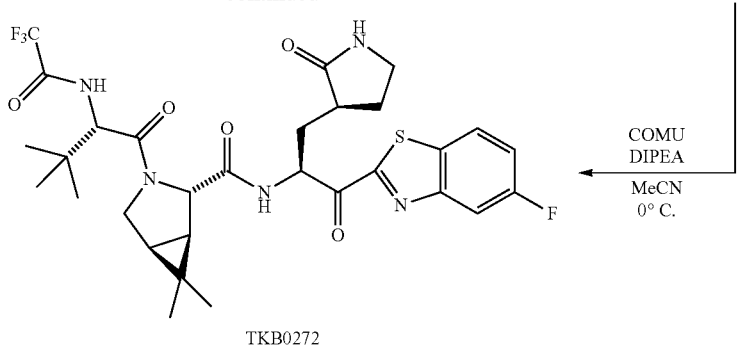

TKB0272

To a solution of Boc-protected amine compound CAZ1235 (163 mg, 0.400 mmol)/dichloromethane (4.0 mL) was added dropwise tetrafluoroboric acid-diethyl ether (0.274 mL, 2.00 mmol) at 0° C. under nitrogen atmosphere, followed by stirring at room temperature for 30 minutes. The reaction liquid was concentrated under reduced pressure, and the residue was washed with 2% methanol-containing diethyl ether. The crude compound of tetrafluoroborate was used in the next reaction without further purification.

The carboxylic acid TIS1038 (160 mg, 0.440 mmol) and COMU (188 mg, 0.439 mmol) were dissolved in acetonitrile (2.0 mL) at 0° C., and DIPEA (0.135 mL, 0.800 mmol) was added. To this reaction liquid was added an acetonitrile (2.0 mL) solution of the crude compound of tetrafluoroborate (0.400 mmol) and the DIPEA (0.135 mL, 0.800 mmol) at 0° C., followed by stirring at room temperature for 23 hours. To the reaction liquid was added a saturated aqueous solution of sodium bicarbonate to stop the reaction, followed by extracting with dichloromethane, drying over anhydrous magnesium sulfate, and concentrating under reduced pressure. The residue was partially purified by automated silica gel flash column chromatography using a developing solvent of chloroform-methanol (100:0 to 19:1) to obtain crude compound TKB0272. Further purification was conducted by preparative reversed-phase HPLC and semi-preparative HPLC (CHIRALPAK IC semi-preparative column) to obtain TKB0272 (22.1 mg, 9%, a mixture of rotamers) as a white solid.

Reversed-phase HPLC (linear gradient 40-70% (B/A+B)/30 min, elution time=22.5 min) for analysis;
$^1$H NMR (500 MHz, CDCl3) δ; 9.28 (d, J=4.0 Hz, 0.2H), 7.95-7.83 (m, 2.8H), 7.36-7.29 (m, 1H), 7.02 (d, J=9.2 Hz, 0.8H), 6.93 (d, J=8.6 Hz, 0.2H), 6.22 (s, 0.8H), 5.99 (s, 0.2H), 5.83-5.79 (m, 0.8H), 5.64-5.60 (m, 0.2H), 4.57 (d, J=9.7 Hz, 0.8H), 4.40 (s, 0.8H), 4.37 (s, 0.2H), 4.29 (d, J=9.2 Hz, 0.2H), 3.98 (dd, J=10.0 Hz and 5.4 Hz, 0.8H), 3.83-3.79 (m, 1H), 3.52-3.47 (m, 0.4H), 3.43-3.36 (m, 1.8H), 3.33-3.26 (m, 0.2H), 2.79-2.73 (m, 0.8H), 2.70-2.64 (m, 0.2H), 2.62-2.56 (m, 0.8H), 2.33-2.29 (m, 0.2H), 2.26-2.21 (m, 0.8H), 2.19-2.12 (m, 0.8H), 2.10-1.94 (m, 1.2H), 1.66 (d, J=7.4 Hz, 0.2H), 1.58 (d, J=8.3 Hz, 0.8H), 1.54 (dd, J=7.4 Hz and 5.2 Hz, 0.8H), 1.48 (dd, J=7.7 Hz and 5.4 Hz, 0.2H), 1.08-1.03 (m, 11H), 0.96 (s, 1.8H), 0.89 (s, 2.2H);
$^{13}$C NMR {1H} (125 MHz, CDCl3) δ; 192.3, 192.1, 181.7, 180.4, 171.2, 170.9, 169.1, 168.8, 166.4, 166.2, 162.3 (d, J=246.3 Hz), 162.2 (d, J=246.5 Hz), 157.1 (q, J=37.6 Hz), 156.6 (q, J=37.3 Hz), 154.5 (d, J=12.1 Hz), 154.4 (d, J=12.1 Hz), 133.0, 123.5 (d, J=9.6 Hz), 123.3 (d, J=9.7 Hz), 117.6-117.4 (m), 116.0 (q, J=288.4 Hz), 115.9 (q, J=288.0 Hz), 111.4 (d, J=22.8 Hz), 111.3 (d, J=24.1 Hz), 61.9, 61.3, 58.3, 57.9, 56.1, 54.8, 48.6, 48.1, 41.3, 40.9, 39.7, 38.9, 37.2, 36.2, 33.9, 33.6, 32.0, 30.8, 29.9, 28.6, 27.9, 26.6, 26.5 (3C), 26.4, 26.3 (3C), 20.2, 19.5, 13.6, 12.7;
HRMS (ESI), m/z calcd for C30H36F4N5O5S [M+H]$^+$ 654.2368, found 654.2367.

(Synthesis Example 6) Synthesis of (1R,2S,5S)-3-((S)-3,3-dimethyl-2-(2,2,2-trifluoroacetamido)butanoyl)-N—((S)-1-(6-fluorobenzo[d]thiazol-2-yl)-1-oxo-3-((S)-2-oxopyrrolidin-3-yl)propan-2-yl)-6,6-dimethyl-3-azabicyclo[3.1.0]hexane-2-carboxamide (No: 273)

In order to synthesize a compound (TKB0273) indicated as No: 273 in Table 1 and represented by the following formula, (1R,2S,5S)-3-((S)-3,3-dimethyl-2-(2,2,2-trifluoroacetamido)butanoyl)-6,6-dimethyl-3-azabicyclo[3.1.0]hexane-2-carboxylic acid (TIS1038) was synthesized by the reaction shown below.

Meanwhile, tert-butyl ((S)-1-(5-fluorobenzo[d]thiazol-2-yl)-1-oxo-3-((S)-2-oxopyrrolidin-3-yl)propan-2-yl)carbamate (CAZ1240) was synthesized in steps shown below.

[Chem. 42]

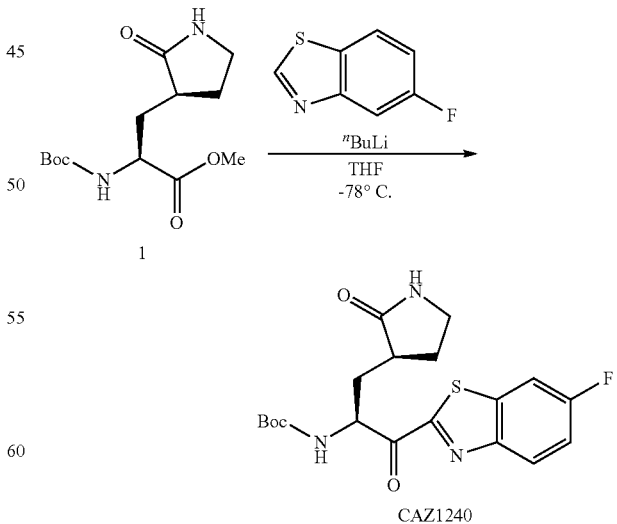

To a solution of 6-fluorobenzothiazole (766 mg, 5.00 mmol)/tetrahydrofuran (9.0 mL) was added dropwise n-butyllithium (1.60M hexane solution, 2.80 mL, 4.48 mmol) at −78° C. over 15 minutes. After stirring for 1 hour, a solution of methyl ester compound 1 (315 mg, 1.10 mmol)/tetrahydrofuran (1.0 mL) was added dropwise at −78° C. over 20 minutes, and continued stirring at −78° C. for 3 hours. To the reaction liquid was added saturated aqueous ammonium chloride to stop the reaction. The mixture liquid was concentrated under reduced pressure, and extracted with dichloromethane. The organic phase was washed with saturated saline, then dried over anhydrous magnesium sulfate, and concentrated under reduced pressure. The residue was purified by silica gel flash column chromatography using a developing solvent of chloroform/methanol (40:1) to obtain CAZ1240 (99.9 mg, 22%) as a red-brown solid.

$^1$H NMR (500 MHz, CDCl3) δ; 8.13 (dd, J=9.1 Hz and 4.8 Hz, 1H), 7.65 (dd, J=8.0 Hz and 2.4 Hz, 1H), 7.33 (ddd, J=8.9 Hz, 8.9 Hz, and 2.4 Hz, 1H), 5.85 (d, J=7.7 Hz, 1H), 5.68 (s, 1H), 5.57-5.54 (m, 1H), 3.41-3.39 (m, 2H), 2.68-2.58 (m, 2H), 2.18-2.02 (m, 3H), 1.44 (s, 9H);

$^{13}$C NMR (125 MHz, CDCl3) δ; 193.0, 179.6, 163.9, 162.3 (d, J=250.8 Hz), 155.9, 150.3, 138.7 (d, J=11.4 Hz), 127.2 (d, J=9.9 Hz), 116.7 (d, J=25.4 Hz), 108.5 (d, J=26.7 Hz), 80.2, 55.5, 40.5, 38.5, 34.6, 28.4 (3C), 28.3;

HRMS (ESI), m/z calcd for C19H22FN3NaO4S [M+Na]$^+$ 430.1207, found 430.1206.

Next, from the compounds TIS1038 and CAZ1240 obtained as described above, TKB0273 was synthesized by the reactions shown below.

[Chem. 43]

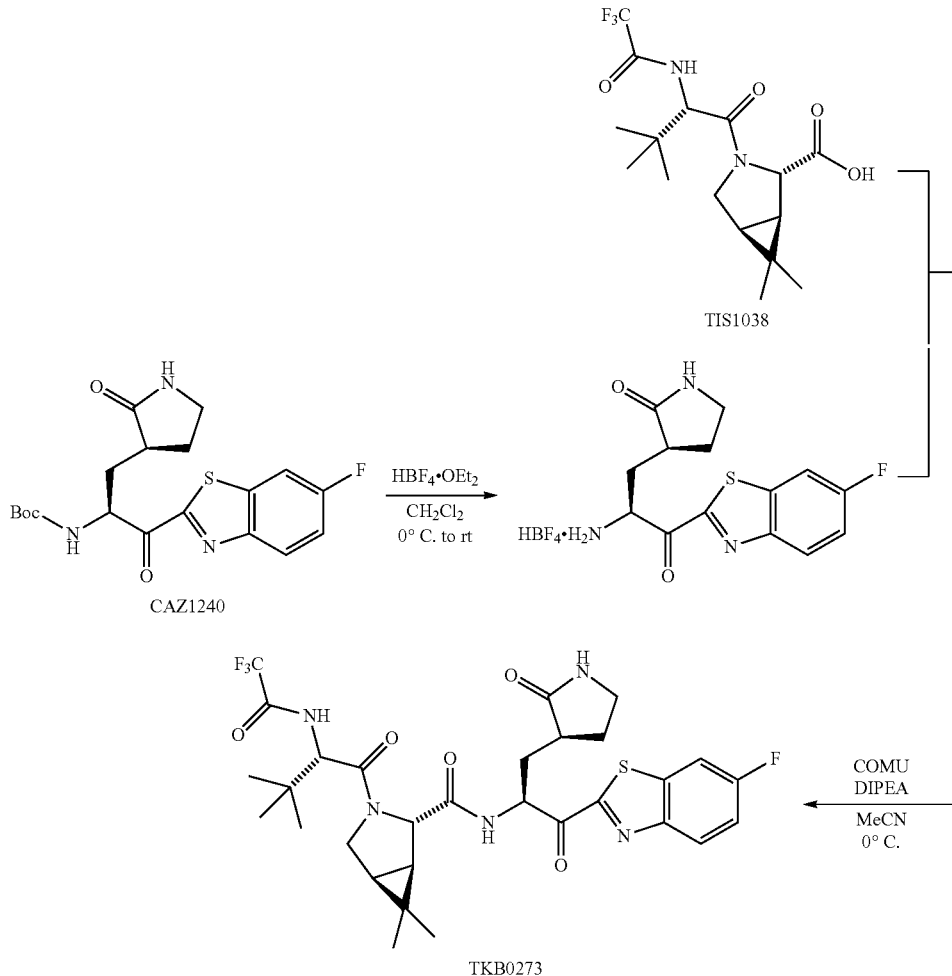

To a solution of Boc-protected amine compound CAZ1240 (204 mg, 0.501 mmol)/dichloromethane (5.0 mL) was added dropwise tetrafluoroboric acid-diethyl ether (0.343 mL, 2.50 mmol) at 0° C. under a nitrogen atmosphere, followed by stirring at room temperature for 1.5 hours. The reaction liquid was concentrated under reduced pressure, and the residue was washed with 2% methanol-containing diethyl ether. The crude compound of tetrafluoroborate was used in the next reaction without further purification.

The carboxylic acid TIS1038 (202 mg, 0.554 mmol) and COMU (236 mg, 0.551 mmol) were dissolved in acetonitrile (4.0 mL) at 0° C., and DIPEA (0.169 mL, 1.00 mmol) was added. To this reaction liquid was added an acetonitrile (2.0 mL) solution of the crude compound of tetrafluoroborate (0.501 mmol) and DIPEA (0.169 mL, 1.00 mmol) at 0° C., followed by stirring at room temperature for 1.5 hours. To the reaction liquid was added a saturated aqueous solution of sodium bicarbonate to stop the reaction, followed by extracting with dichloromethane, drying over anhydrous magnesium sulfate, and concentrating under reduced pressure. The residue was partially purified by automated silica gel flash column chromatography using a developing solvent of chloroform-methanol (100:0 to 47:3) to obtain crude compound TKB0273. Further purification was conducted by preparative reversed-phase HPLC and semi-preparative HPLC (CHIRALPAK IC semi-preparative column) to obtain TKB0273 (30.6 mg, 9%, a mixture of rotamers) as a white solid.

Reversed-phase HPLC (linear gradient 40-70% (B/A+B)/ 30 min, elution time=22.5 min) for analysis;

$^1$H NMR (500 MHz, CDCl3) δ; 9.42 (d, J=4.2 Hz, 0.2H), 8.17-8.12 (m, 1H), 8.02 (d, J=7.1 Hz, 0.8H), 7.65-7.61 (m, 1H), 7.35-7.29 (m, 1H), 7.02 (d, J=9.0 Hz, 0.8H), 6.93 (d, J=8.8 Hz, 0.2H), 5.97 (s, 0.8H), 5.86 (s, 0.2H), 5.81-5.76 (m, 0.8H), 5.63-5.59 (m, 0.2H), 4.57 (d, J=9.4 Hz, 0.8H), 4.40 (s, 0.8H), 4.36 (s, 0.2H), 4.29 (d, J=9.0 Hz, 0.2H), 3.97 (dd, J=10.2 Hz and 5.4 Hz, 0.8H), 3.83-3.78 (m, 1H), 3.51-3.45 (m, 0.4H), 3.41-3.25 (m, 1.8H), 2.75-2.61 (m, 1H), 2.60-2.54 (m, 0.8H), 2.32-2.28 (m, 0.2H), 2.24-2.11 (m, 1.6H), 2.07-1.91 (m, 1.4H), 1.66 (d, J=7.7 Hz, 0.2H), 1.58 (d, J=7.7 Hz, 0.8H), 1.53 (dd, J=7.5 Hz and 5.3 Hz, 0.8H), 1.48 (dd, J=7.5 Hz and 5.6 Hz, 0.2H), 1.08-1.02 (m, 11.5H), 0.96 (s, 2H), 0.88 (s, 2.5H);

$^{13}$C NMR {1H} (125 MHz, CDCl3) δ; 192.2, 192.0, 181.5, 180.0, 171.2, 170.8, 169.1, 168.7, 164.0 (d, J=3.9 Hz), 163.8 (d, J=3.6 Hz), 162.3 (d, J=251.1 Hz), 162.2 (d, J=251.3 Hz), 157.1 (q, J=37.2 Hz), 156.5 (q, J=37.0 Hz), 150.4, 150.3, 138.7 (d, J=11.7 Hz), 127.3 (d, J=10.3 Hz), 127.2 (d, J=9.9 Hz), 116.7 (d, J=25.3 Hz), 116.5 (d, J=25.5 Hz), 116.0 (q, J=288.0 Hz), 116.0 (q, J=287.8 Hz), 108.5 (d, J=26.8 Hz), 108.4 (d, J=26.4 Hz), 61.9, 61.2, 58.3, 57.9, 56.1, 54.9, 48.6, 48.1, 41.1, 40.6, 39.6, 38.8, 37.2, 36.2, 33.9, 33.5, 32.0, 30.8, 30.0, 28.8, 27.8, 26.6, 26.5 (3C), 26.4, 26.3 (3C), 20.2, 19.5, 13.6, 12.7;

HRMS (ESI), m/z calcd for C30H36F4N5O5S [M+H]$^+$ 654.2368, found 654.2364.

In addition, although specific methods are not described, compounds represented by the following formulae were also synthesized like the above-described compounds.

[Chem. 44]

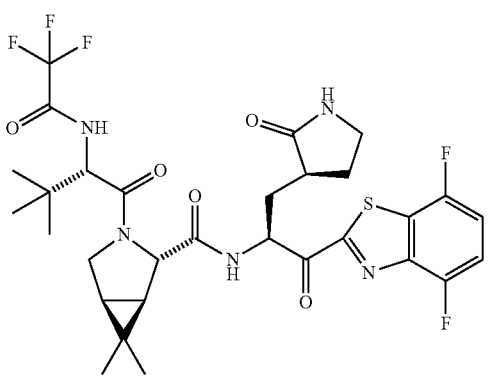

247

[Chem. 45]

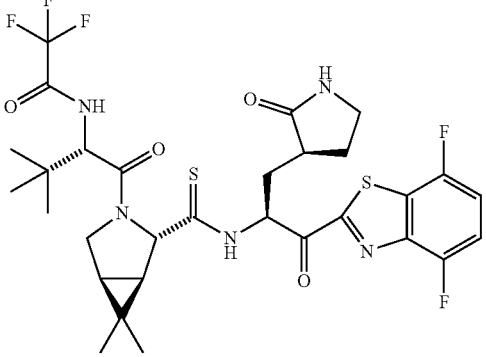

247S

[Chem. 46]

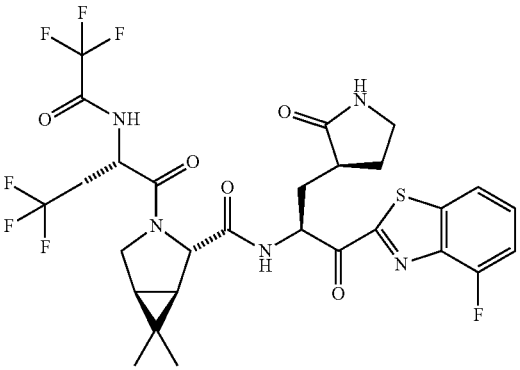

248

[Chem. 47]

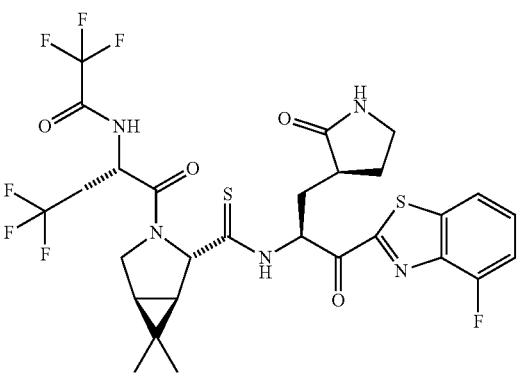

248S

[Chem. 48]
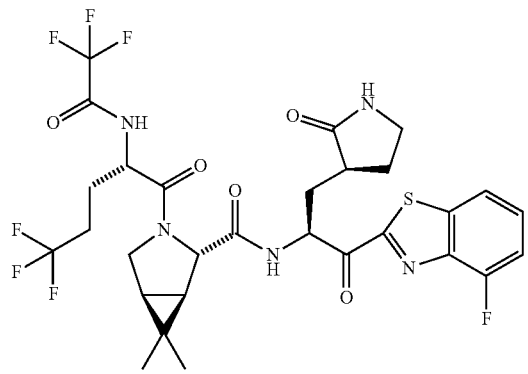
249
[Chem. 49]
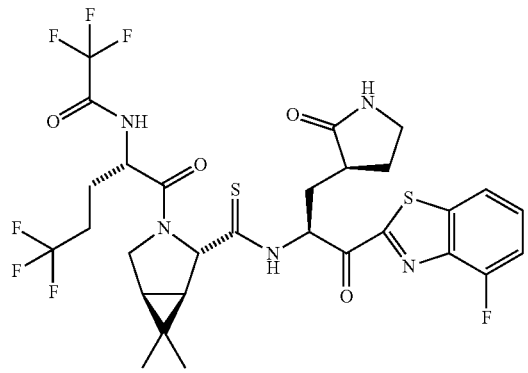
249S
[Chem. 50]
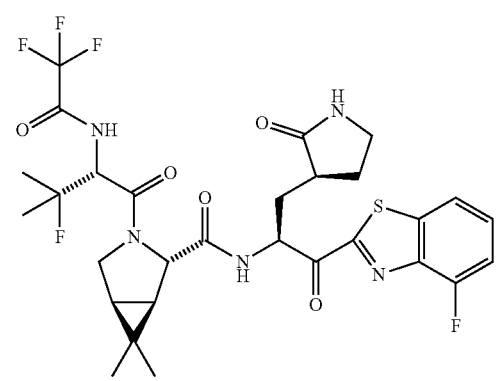
250
[Chem. 51]
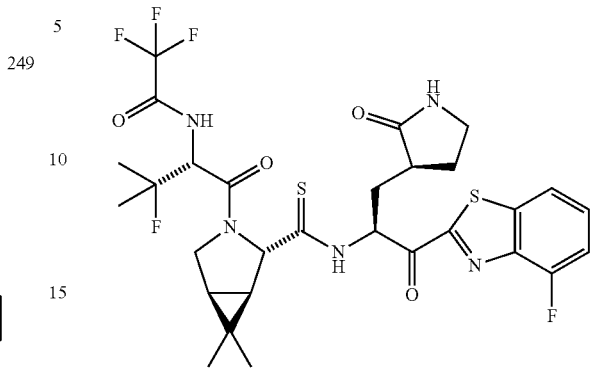
250S
[Chem. 52]
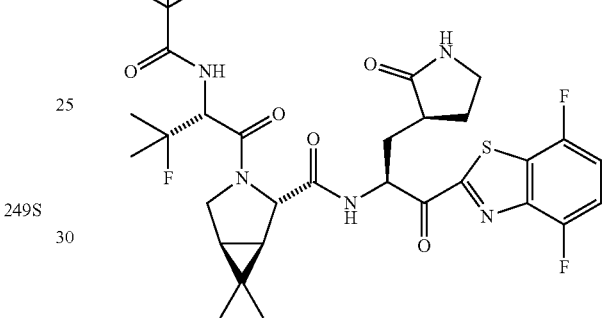
251
[Chem. 53]
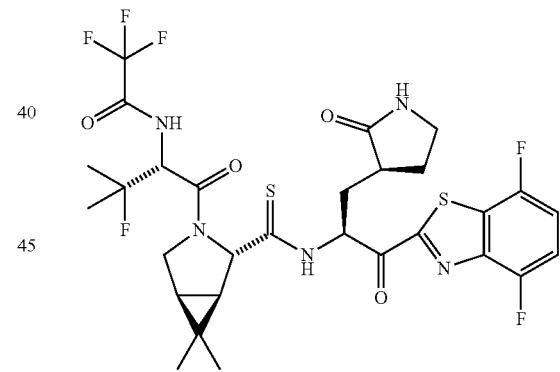
251S
[Chem. 54]
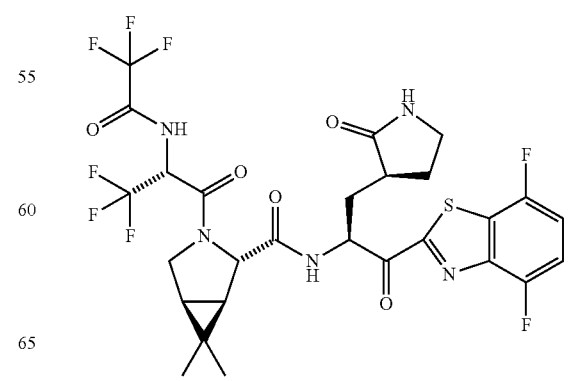
252

[Chem. 55]

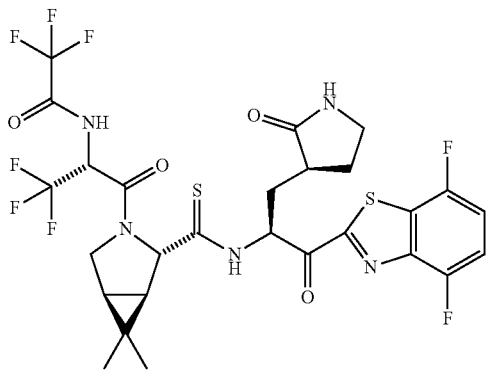

[Chem. 56]

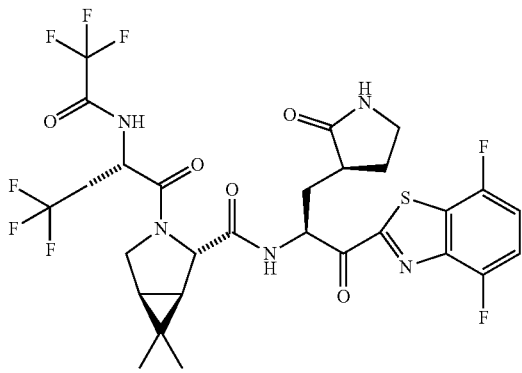

[Chem. 57]

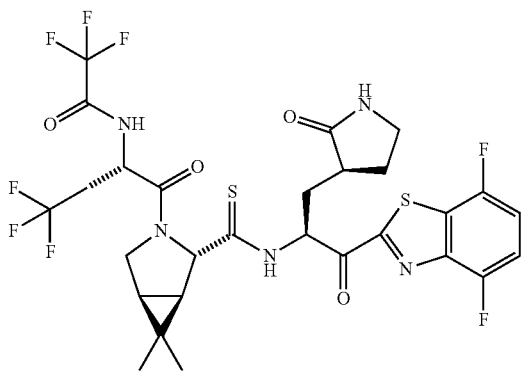

[Chem. 58]

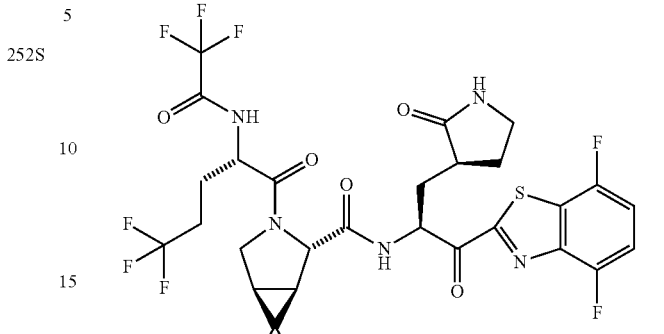

[Chem. 59]

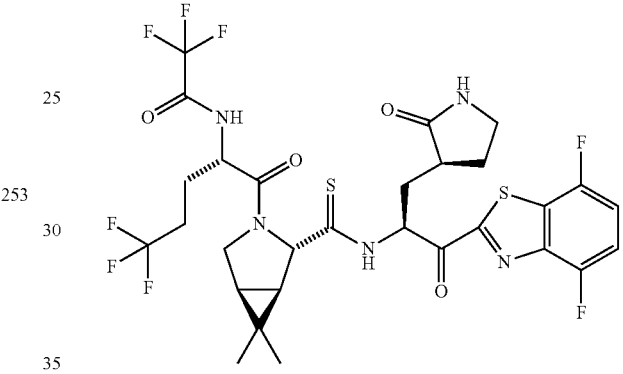

Then, the compounds thus obtained were evaluated in terms of virus protease inhibitory activity ($IC_{50}$), antiviral activity ($EC_{50}$), cytotoxicity ($CC_{50}$), in vivo half-life ($T_{1/2}$), and bioavailability (BA) in accordance with the methods described below.

(Test Example 1) Evaluation of Virus Protease (Main Protease) Inhibitory Activity The Mpro/3CL protease enzyme inhibitory activity of each of the above compounds (test compounds) was evaluated using an assay kit based on FRET (product name: 3CL Protease Untagged Assay Kit, BPS Biosceience, CA, USA) Specifically, first the test compound of each concentration after the serial dilution was dispensed to a 96 well plate at 10 μl/well. Then, the 3CL protease was added at 15 ng/30 μL/well, followed by stirring at room temperature for 30 minutes to incubate. Immediately after that, 200 μM of 3CL Protease fluorogenic substrate was added at 10 μL/well. After incubation up to 4 hours under a condition of 25° C., the fluorescent emission intensity (excitation 360 nm/luminescence 460 nm) was quantified using microplate reader Cytation 5 (BioTek). From the quantified value, the $IC_{50}$ value was calculated to evaluate the anti-SARS-CoV-2 enzyme inhibitory activity of each test compound. The results thus obtained are shown in Table 2.

(Test Example 2) Evaluation of Anti-SARS-CoV-2 Activity

The SARS-CoV-2 strain (SARS-CoV-2WK-521) assigned from the National Institute of Infectious Diseases (Japan) was used as an infection source. As the cells to be infected, Vero E6 cells were used, and these cells were continuously cultured and maintained in 10% FCS-containing DMEM medium supplemented with antibiotics (penicillin and streptomycin each in 100 μg/ml). The Vero E6 cells were inoculated in a 96 well plate to be 1×10⁴ cells/well. Next day, the SARS-CoV-2WK-521 virus was exposed to Vero E6 cells for 1 hour at a multiplicity of infection (MOI) of 0.05, and the virus fluid was removed by washing. Thereafter, media supplemented with each test compound of each concentration after the serial dilution was added, and cultured for 3 days under standard culture conditions of 37° C. and 5% $CO_2$. Then, the supernatant of each well was collected, and SARS-CoV-2 RNA was extracted using QIAamp Viral RNA Mini Kit, and the number of copies of the virus was quantified by RT-PCR. From the quantified value, the $EC_{50}$ value was calculated to evaluate the anti-SARS-CoV-2 activity of each test compound. In addition, the $EC_{75}$ value was also obtained in the same manner. Furthermore, the $EC_{99}$ value was calculated as an index of concentration which indicated the 100% activity. The obtained results are shown in Table 2, Table 3, and Table 5.

(Test Example 3) Cytotoxicity Test

The cytotoxicity test of the test compounds was conducted using Vero E6 cells. Specifically, Vero E6 cells were inoculated in a 96 well plate to be 1×10⁴ cells/well, and cultured under standard culture conditions of 3 days, 37° C., and 5% $CO_2$ together with media supplemented with each test compound of each concentration after serial dilution. Thereafter, the viable cell count of each well was quantified by MTT assay to calculate 50% cytotoxicity concentration ($CC_{50}$). The obtained results are shown in Table 2, Table 3, and Table 5.

(Test Example 4) Measurement of Pharmacokinetic Parameters

The measurement of the in vivo half-life of each test compound was conducted using mice. Specifically, each test compound was administered (intravenously administered) from the tail vein at 2 mg/kg, and the blood was collected 15, 30, 60, 120, 240 minutes after the administration, and 480 minutes after the administration. The concentration of the compound in the blood was measured by LC/MS/MS, and the in vivo half-life ($T_{1/2}$) of the compound was calculated (n=2).

Figure 2:
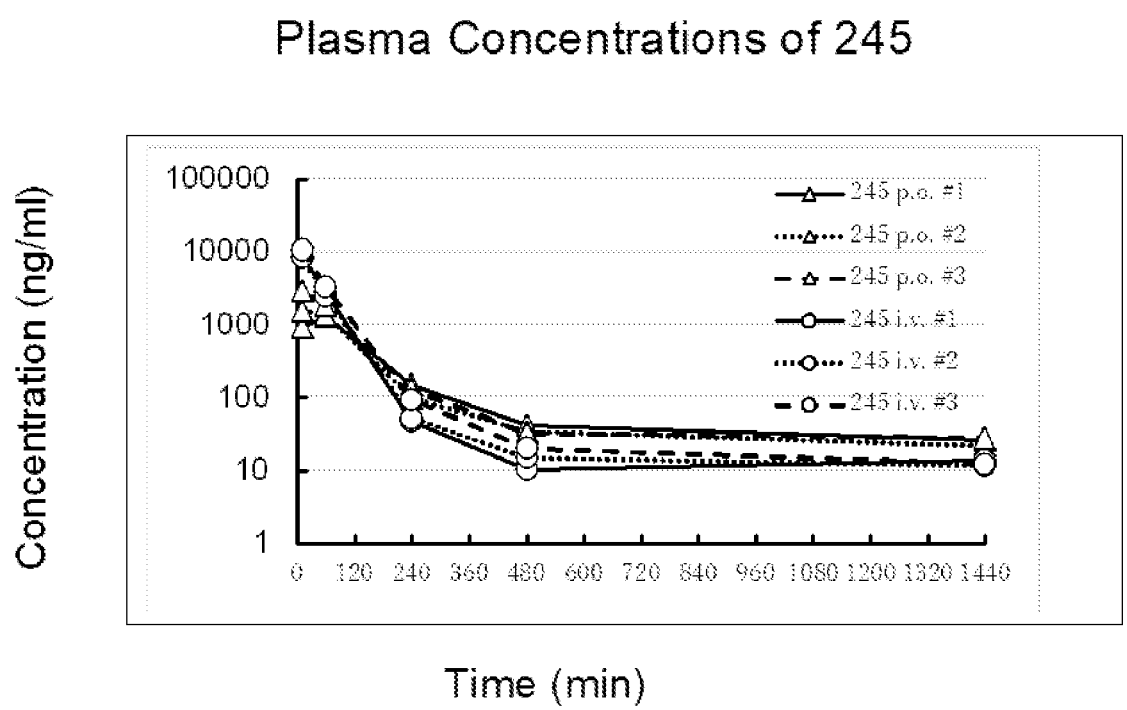
FIG. 2 is a graph showing changes in blood concentration of the compound indicated as No: 245 in Table 1 with time.
Figure 3:
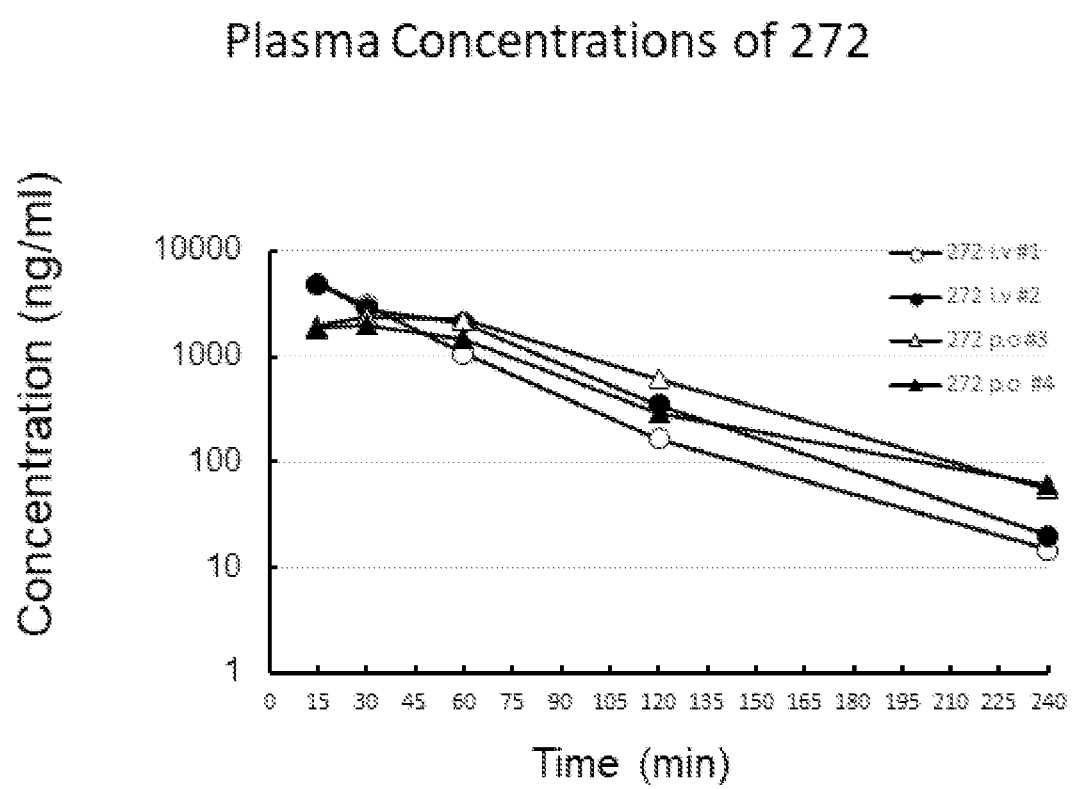
FIG. 3 is a graph showing changes in blood concentration of a compound indicated as No: 272 in Table 1.

In addition, the bioavailability (BA) of each test compound was also obtained. Specifically, each test compound was intravenously administered (I.V.), or orally administered (P.O.), or intraperitoneally administered (I. P.) at 2 mg/kg, and the blood was collected 15, 30, 60, 120, 240 minutes after the administration, and 480 minutes after the administration. The concentration of the compound in the blood was measured by LC/MS/MS, and graphs showing the time courses of the plasma drug concentrations were created (the obtained results are shown in FIGS. 1 to 3). Then, the area of the portion surrounded by the blood concentration and the time axis (the area under the blood concentration-time curve: AUC) in each mode of administration was calculated, and further the BA was calculated in accordance with the following equation based on the AUC thus obtained.

$BA(\%) = AUC_{P.O.}/AUC_{I.V.} \times D_{I.V.}/D_{P.O.} \times 100$ (D represents the dosage of the drug in each mode of administration).

TABLE 2

| Compound No. | $IC_{50}$ (μM) | $EC_{50}$ (μM) | $EC_{99}$ (μM) | $CC_{50}$ (μM) |
| --- | --- | --- | --- | --- |
| 243 | 0.8 | 0.75 | 9.4 | >100 |
| 244 | 0.6 | 0.6 | 0.99 | >100 |
| 245 | 0.002 | 0.08 | 0.95 | >100 |
| 245s | 0.3 | 0.31 | 0.98 | >100 |
| 247 | — | <0.2 | <1.0 | >100 |
| 247s | — | <0.3 | <1.0 | >100 |
| 248 | — | <0.2 | <1.0 | >100 |
| 248s | — | <0.3 | <1.0 | >100 |
| 249 | — | <0.2 | <1.0 | >100 |
| 249s | — | <0.3 | <1.0 | >100 |
| 250 | — | <0.2 | <1.0 | >100 |
| 250s | — | <0.3 | <1.0 | >100 |
| 251 | — | <0.2 | <1.0 | >100 |
| 251s | — | <0.3 | <1.0 | >100 |

TABLE 3

| Compound No. | $EC_{50}$ (μM) | CC50 (μM) |
| --- | --- | --- |
| 272 | 0.008 | >80 |
| 273 | 0.052 | >80 |

In the table, "<0.2" or "<0.3" in the $EC_{50}$ value indicates that the compound exhibited an antiviral activity of over 50% at a concentration of 0.2 μM or 0.3 μM. "<1.0" in the $EC_{99}$ value indicates that the compound exhibited an antiviral activity of over 99% at a concentration of 1.0 μM. ">100" and ">80" in the $CC_{50}$ value indicate that the compounds did not exhibit cytotoxicity at a concentrations of 100 μM and 80 μM, respectively.

As are clear from the results shown in Tables 2 and 3, all the test compounds exhibited such excellent antiviral activities that $EC_{50}$ for SARS-CoV-2 was less than 1 μM. In addition, similarly, the test compounds exhibited significant inhibitory activities ($IC_{50}$) against the main protease of SARS-CoV-2. On the other hand, these compounds had a low toxicity ($CC_{50}$) to the cells which served as the hosts of the virus. In addition, in the examples of administrations of the compounds conducted to calculate the BA and the like, no acute or subacute toxicity to mice was observed.

Moreover, among these test compounds, it was observed that the compounds indicated by Nos: 245 and 245S exhibited particularly excellent inhibitory activities against the virus protease. Further, the same compounds were also observed to have particularly excellent antiviral activities.

Furthermore, in (Test Example 2), the anti-SARS-CoV-2 activity of the compounds indicated by Nos: 245 and 245S were evaluated for the variants (all assigned from the National Institute of Infectious Diseases (Japan), which are shown in Table 4 given below) instead of SARS-CoV-2WK-521. As a result, although not shown in table or figure, the compounds also exhibited excellent antiviral activities against any of the tested variants like the parent strain.

TABLE 4

| Variants | Countries where variants emerged |
|---|---|
| WK-521 | China |
| TX7-501 | Brazil |
| TY8-612 | South Africa |
| QHN001 | the United Kingdom |
| K1734 | India |
| K5356 | India |

(Comparative Example 2) Comparison with PF-7321332 Compound

The compound PF-7321332 shown below is disclosed in NPL 4 as a compound that exhibits inhibitory activity against the main protease of SARS-CoV-2 and exhibits antiviral activity.

[Chem. 60]

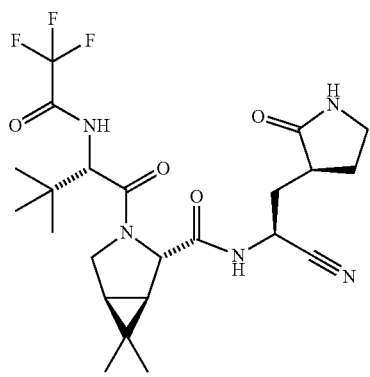

PF-7321332

Thus, this compound was subjected to the above-described (Test Example 2) to (Test Example 4) under the same conditions to calculate $EC_{50}$, $EC_{75}$, $EC_{99}$, and $CC_{50}$ for SARS-CoV-2, which were compared with those of the above-described compounds. The obtained result are shown in Table 5.

TABLE 5

| Compound | $EC_{50}$ (μM) | $EC_{75}$ (μM) | $EC_{99}$ (μM) | $CC_{50}$ (μM) |
|---|---|---|---|---|
| PF-7321332 | 1.9 | 4.39 | 9.68 | >100 |
| 245 | 0.08 | 0.29 | 0.95 | >100 |
| 245s | 0.31 | 0.55 | 0.98 | >100 |

As a result, as shown in Table 5, while $EC_{50}$ of the compounds indicated by Nos: 245 and 245S were 0.08 μM and 0.31 μM, $EC_{50}$ of the PF-7321332 compound was 1.9 μM. Moreover, as shown in Table 5, $EC_{99}$ of the compounds indicated by Nos: 245 and 245S were 0.95 μM and 0.98 μM, $EC_{99}$ of the PF-7321332 compound was 9.68 μM.

From the above results, it was revealed that at least the compounds indicated by Nos: 245 and 245S respectively exhibited 20 times and 6 times or more excellent $EC_{50}$ values, and also exhibited about 10 times excellent $EC_{99}$ values, thus having strong antiviral effects with lower concentrations as drug candidates, as compared with the PF-7321332 compound. Particularly, both compounds almost completely suppressed the proliferation and the like of the SARS-CoV-2 with a concentration of 1 μM.

In addition, regarding the compound indicated by No: 245, $T_{1/2}$ calculated from the graph shown in FIG. 1 was 45 minutes or more. Moreover, BA calculated from AUC of the same graph was 31% or more, which suggested that sufficient therapeutic effect and the like were able to be obtained by three oral administrations or less per day. Note that the same experiment was conducted again on the same compounds, and BA was calculated from AUC of the obtained graph shown in FIG. 2. As a result, BA of the compound indicated by No: 245 was 47.7%. In addition, the same experiment was conducted on the compound indicated by No: 272, and BA was calculated from AUC of the obtained graph shown in FIG. 3. As a result, BA of the compound indicated by No: 272 was 99.3%.

(Comparative Example 2) Comparison with 2420 (YH-53) Compound

Compound 2420 (YH-53) shown below is disclosed in NPL 4 as compound 5h that exhibits inhibitory activity against the main protease of SARS-CoV (SARS-CoV-1), which became epidemic in 2003.

[Chem. 61]

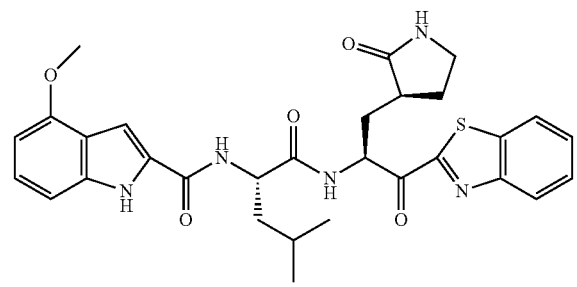

2420 (YH-53)

Hence, this compound was subjected to the above-described (Test Example 2) and (Test Example 4) to calculate $EC_{50}$ and $T_{1/2}$ regarding SARS-CoV-2, which were compared with those of the above-described compounds.

As a result, while $EC_{50}$ of the compounds indicated by Nos: 245 and 245S were 0.08 μM and 0.31 μM, $EC_{50}$ of the 2420 compound was 2.7 to 3.2 μM. In addition, while the compound of No: 245 had $T_1/2$ of 45 minutes or more, the 2420 compound had $T_{1/2}$ of about 10 minutes.

From the above-described results, it was revealed that at least the compounds indicated by Nos: 245 and 245S had excellent antiviral activities as drug candidates as compared with the 2420 compound as well.

INDUSTRIAL APPLICABILITY

As described above, the present invention makes it possible to provide a compound that has an excellent antiviral activity against a virus such as SARS-CoV-2 and has a low toxicity to host cells. Moreover, the compound of the present invention is also favorable in terms of pharmacokinetics. Furthermore, the compound of the present invention exhibits antiviral activity of a similar level to the existing variants. Therefore, the present invention is significantly useful in preventing or treating SARS-CoV-2 infectious disease and the like, which is currently pandemic.

The invention claimed is:

1. A compound represented by any one of the following formula:

272

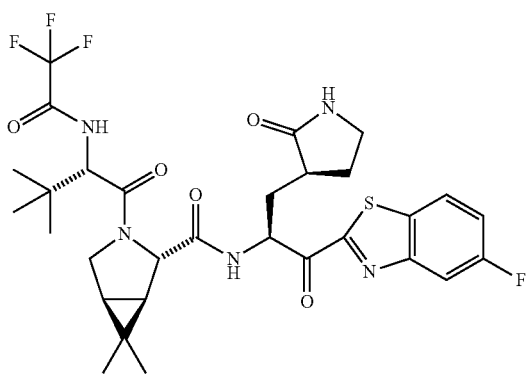

245

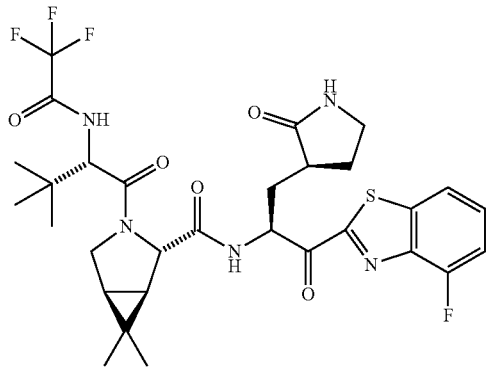

248

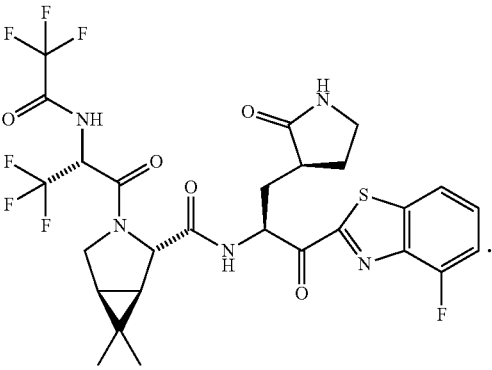

2. An antiviral drug comprising the compound according to claim 1 as an active ingredient and a pharmaceutically acceptable carrier or medium.

3. The antiviral drug according to claim 2, that is an anti-SARS-CoV-2 virus agent.

* * * * *